(12) United States Patent
Lerner et al.

(10) Patent No.: US 11,945,107 B2
(45) Date of Patent: Apr. 2, 2024

(54) OPEN-LOOP CONTROL FOR EXOSKELETON MOTOR

(71) Applicant: Arizona Board of Regents on Behalf of Northern Arizona University, Flagstaff, AZ (US)

(72) Inventors: Zachary Forest Lerner, Flagstaff, AZ (US); Greg Orekhov, Flagstaf, AZ (US); Jason Luque, Flagstaff, AZ (US)

(73) Assignee: ARIZONA BOARD OF REGENTS ON BEHALF OF NORTHERN ARIZONA UNIVERSITY, Flagstaff, AZ (US)

( * ) Notice: Subject to any disclaimer, the term of this patent is extended or adjusted under 35 U.S.C. 154(b) by 494 days.

(21) Appl. No.: 17/207,317

(22) Filed: Mar. 19, 2021

(65) Prior Publication Data

US 2021/0291355 A1 Sep. 23, 2021

Related U.S. Application Data

(60) Provisional application No. 62/992,636, filed on Mar. 20, 2020.

(51) Int. Cl.
*B25J 9/00* (2006.01)
*A61H 3/00* (2006.01)
*B25J 9/16* (2006.01)

(52) U.S. Cl.
CPC .............. *B25J 9/0006* (2013.01); *A61H 3/00* (2013.01); *B25J 9/163* (2013.01); *A61H 2003/007* (2013.01); *A61H 2201/1215* (2013.01); *A61H 2201/123* (2013.01); *A61H 2201/164* (2013.01); *A61H 2201/165* (2013.01); *A61H 2201/5061* (2013.01); *A61H 2201/5071* (2013.01); *A61H 2201/5097* (2013.01); *A61H 2205/106* (2013.01)

(58) Field of Classification Search
CPC ................ A61H 1/0254; A61H 1/0263; A61H 3/00–068; A61H 2003/001–065; B25J 9/0006
See application file for complete search history.

(56) References Cited

U.S. PATENT DOCUMENTS

| | | | | |
|---|---|---|---|---|
| 2017/0043482 A1* | 2/2017 | Hyun | ..................... | B25J 9/0006 |
| 2019/0240103 A1* | 8/2019 | Hepler | ..................... | A61H 3/00 |
| 2019/0336383 A1* | 11/2019 | Song | ..................... | A61H 1/024 |

(Continued)

OTHER PUBLICATIONS

G. M. Gasparri, J. Luque and Z. F. Lerner, "Proportional Joint-Moment Control for Instantaneously Adaptive Ankle Exoskeleton Assistance," in IEEE Transactions on Neural Systems and Rehabilitation Engineering, vol. 27, No. 4, pp. 751-759, Apr. 2019, doi: 10.1109/TNSRE.2019.2905979. Published Mar. 19, 2019 (Year: 2019).*

(Continued)

*Primary Examiner* — Valerie L Woodward
*Assistant Examiner* — Paige Kathleen Bugg
(74) *Attorney, Agent, or Firm* — Quarles & Brady LLP

(57) ABSTRACT

A method of controlling a drive motor for a powered ankle exoskeleton is disclosed. The method includes modeling motor drive current as a linear function of desired torque and ankle angular velocity, and then controlling motor current as a function of measured torque and determined ankle angular velocity.

6 Claims, 12 Drawing Sheets

(56) References Cited

U.S. PATENT DOCUMENTS

2021/0251838 A1* 8/2021 Ortlieb .................. B25J 9/0006

OTHER PUBLICATIONS

G. Orekhov et al., "Ankle Exoskeleton Assistance Can Improve Over-Ground Walking Economy in Individuals with Cerebral Palsy," IEEE Trans. Neural Syst. Rehabil. Eng., vol. 28, No. 2, pp. 461-467, 2020.

M. Gasparri et al., "Proportional Joint-Moment Control for Instantaneously Adaptive Ankle Exoskeleton Assistance," IEEE Trans. Neural Syst. Rehabil. Eng., vol. 27, No. 4, pp. 751-759, 2019.

I. Kang et al., "The Effect of Hip Assistance Levels on Human Energetic Cost Using Robotic Hip Exoskeletons," IEEE Robot. Autom. Lett., vol. 4, No. 2, pp. 430-437, 2019.

E. M. McCain et al., "Mechanics and Energetics of Post-Stroke Walking Aided By A Powered Ankle Exoskeleton With Speed-Adaptive Myoelectric Control," J. Neuroeng. Rehabil., vol. 16, No. 1, 2019.

Z. F. Lerner et al., "An Untethered Ankle Exoskeleton Improves Walking Economy in a Pilot Study of Individuals With Cerebral Palsy," IEEE Trans. Neural Syst. Rehabil. Eng., vol. 26, No. 10, pp. 1985-1993, 2018.

L. N. Awad et al., "A Soft Robotic Exosuit Improves Walking in Patients After Stroke," Sci. Transl. Med., vol. 9, No. 400, pp. 1-12, 2017.

Z. F. Lerner et al., "A Lower-Extremity Exoskeleton Improves Knee Extension in Children With Crouch Gait From Cerebral Palsy," Sci. Transl. Med., vol. 9, No. 404, 2017.

L. F. Yeung et al., "Design of an Exoskeleton Ankle Robot for Robot-Assisted Gait Training of Stroke Patients," in IEEE International Conference on Rehabilitation Robotics, 2017.

M. Mooney et al., "Autonomous Exoskeleton Reduces Metabolic Cost of Walking," in 2014 36th Annual International Conference of the IEEE Engineering in Medicine and Biology Society, EMBC 2014, pp. 3065-3068, 2014.

B. Ugurlu et al., "A Framework for Sensorless Torque Estimation and Control in Wearable Exoskeletons," in International Workshop on Advanced Motion Control, AMC, 2012.

D. J. Farris et al., "The Mechanics and Energetics of Human Walking and Running: A Joint Level Perspective," J. R. Soc. Interface, vol. 9, No. 66, pp. 110-118, 2012.

M. B. Wiggin et al., "An Exoskeleton Using Controlled Energy Storage and Release to Aid Ankle Propulsion," in IEEE International Conference on Rehabilitation Robotics, 2011.

N. Vitiello et al., "A Sensorless Torque Control for Antagonistic Driven Compliant Joints," Mechatronics, vol. 20, No. 3, pp. 355-367, 2010.

S. K. Au et al., "Powered Ankle-Foot Prosthesis Improves Walking Metabolic Economy," IEEE Trans. Robot., vol. 25, No. 1, pp. 51-66, 2009.

D. P. Ferris et al., "Robotic Lower Limb Exoskeletons Using Proportional Myoelectric Control," in Proceedings of the 31st Annual International Conference of the IEEE Engineering in Medicine and Biology Society: Engineering the Future of Biomedicine, EMBC 2009, 2009.

G. S. Sawicki et al., "Mechanics and Energetics of Level Walking With Powered Ankle Exoskeletons," J. Exp. Biol., vol. 211, No. 9, pp. 1402-1413, 2008.

A. Hreljac, "Determinants of the Gait Transition Speed During Human Locomotion: Kinematic Factors," J. Biomech., vol. 28, No. 6, pp. 669-677, 1995.

T. Murakam et al., "Torque Sensorless Control in Multidegree-of-Freedom Manipulator," IEEE Trans. Ind. Electron., vol. 40, No. 2, pp. 259-265, 1993.

R. L. Waters et al., "Energy-Speed Relationship of Walking: Standard Tables," J. Orthop. Res., vol. 6, No. 2, pp. 215-222, 1988.

* cited by examiner

OPEN-LOOP CONTROL FOR EXOSKELETON MOTOR

CROSS-REFERENCE TO RELATED APPLICATIONS

This US patent application claims priority from the U.S. Provisional Patent Application No. 62/992,636 filed on Mar. 20, 2020, the disclosure of which is incorporated herein by reference. All references mentioned in this application are herein incorporated by reference without disclaimer.

STATEMENT REGARDING FEDERALLY FUNDED RESEARCH

This invention was made with Government support under Grant No. 1R15HD095260 awarded by the United States National Institutes of Health and Grant No. 1756029 awarded by the United States National Science Foundation. The Government may have certain rights in the invention.

BACKGROUND OF THE INVENTION

Impairment of the human neuromuscular system, including from amputation, stroke, Parkinson's disease, and cerebral palsy (CP), often leads to lower-extremity impairment and significantly reduced long-term mobility. Despite conventional treatments and walking aids, nearly all affected individuals fail to attain normal function and activity levels. Advances in actuators, power storage, and computing have led to the design and implementation of robot-assisted therapy and mobility. Powered exoskeletons and prostheses designed to increase mobility may augment the ankle joint, because proper ankle function is essential for efficient bipedal walking. Neuromuscular impairment affecting the lower-extremity typically results in reduced ankle push-off during mid-late stance. Many existing wearable robotic assistive devices have exhibited limited or no benefit outside of controlled laboratory environments, with effective control a primary limiting factor.

The control of lower-limb exoskeletons to augment or restore mobility in real-world settings for individuals with neuromuscular impairment remains a critical challenge in the field wearable robotics. Powered exoskeleton and prostheses control strategies capable of improving mobility must adapt to, and transition between, the diverse locomotor conditions encountered during daily life, such as gait initiation, walking at different speeds, and across varied terrain. Additionally, in order to successfully adopt wearable robotic devices into daily life, their control strategies must be adaptable to variable environmental conditions, allow for self-implementation, and maximize ease of use.

A variety of control strategies have been developed for powered exoskeletons and prostheses across a number of walking conditions, yet limitations exist for their practical implementation in real-world settings. The use of electromyography (EMG) signals has been used to distinguish ambulatory conditions. However, in clinical populations, such as CP, muscle spasticity can saturate the volitional neuromuscular control in the EMG pattern. Furthermore, EMG control relies on and is susceptible to changes in electrode-skin conductivity, motion artifact, electrode placement, fatigue, and cross-talk; these challenges pose realistic barriers for using EMG control during daily life. The use of human in the loop optimization, while successful in unimpaired individuals walking in controlled conditions (i.e., treadmill or stair stepper at set speeds), may require relatively lengthy learning periods (120+ minutes), and is not suited for adapting to instantaneous changes in task and for individuals with limited mobility. The use of algorithms to detect a user's intent has demonstrated decent reliability for classifying level walking, sitting, standing, and stair ascent/decent. Yet, intent recognition techniques have limited applicability for clinical populations that exhibit considerable gait variability and progressive ambulatory deterioration. Moreover, the inability or failure to detect completely unique conditions (e.g., irregular walking, stumbling, unforeseen obstacles, unexpected disturbances, etc.) could have dangerous consequences.

Co-owned U.S. patent application Ser. No. 16/403,121, which is incorporated herein by reference in its entirety, describes a number of methods of providing closed-loop control of a wearable exoskeleton (i.e., orthosis) designed to provide assistance with the movement of a user's foot and ankle while walking. One such orthosis is described below in reference to FIGS. 2-6, and in co-owned U.S. patent application Ser. No. 16/409,671, which is also incorporated herein by reference in its entirety.

FIG. 1 illustrates, at a high level, the closed-loop orthosis control method set forth above, which relies on motor control as a function of measurement of total torque. According to the method of FIG. 1, control of an assistive device 100 (e.g. an ankle exoskeleton assistive device) is based on data received from a force or pressure sensor 102. One or more sensors 102 may be disposed on assistive device 100 (e.g. force sensors against a foot or inside a shoe) and configured to measure force or pressure with which the wearer's foot pushes against a ground or floor surface. Sensor 102 transmits electrical signals 103 to measurement device 104. Measurement device 104 may interpret sensor electrical signal 103 as measured force or pressure 105, which may include force generated by user and by assistive device 100. Measured force 105 may then be processed with or without a mapping function or regression equation 106 to determine user-generated torque 107. That is, measured force 105 may be translated directly or indirectly into an approximation of the torque force being generated at the user's ankle. User-generated torque 107 may then be multiplied by scaling factor 108 (which may be user-selected) to determine desired assistive torque 109. Desired assistive torque 109 may then be used to control the operation of motor controller 110 (e.g. a proportional-integral-derivative (PID) feedback motor controller), which, in turn, sends motor instructions 111 to motor 112. Specifically, motor 112 is operated to apply assistive torque 113 to the body of the user (e.g. assistive ankle torque) with a force magnitude determined by desired assistive torque 109.

The control strategy depicted in FIG. 1, herein referred to as "proportional joint-moment control", may be based on a concept of providing assistance that is proportional to an instantaneous demand placed on a biological joint (i.e., a net moment generated by muscles and other biological tissues crossing a joint). This approach may include estimating a user's joint moment in real-time and prescribing assistive torque as a fixed percentage of the user's joint moment. In certain systems, desired assistive torque 109 (hereinafter referred to as $T_{set}$) is determined, and then motor 112 is controlled, in a closed-loop fashion, to minimize the error between torque measured at the user's ankle by a torque sensor ($T_{meas}$) and $T_{set}$.

Closed-loop control of an orthosis, as set forth immediately above, by which assistive torque is instantaneously (or substantially instantaneously) synchronized with a net muscular demand at a joint has the advantage of approximately corresponding to a user's intention. Additionally, providing a motor control signal via a closed-loop proportional-derivative (PD) torque-feedback controller does enable the method to effectively adapt the torque set points to variable ankle demand. There are, however, shortcomings to this approach. For example, the use of this closed-loop scheme, in practice, may cause high battery power consumption, loud operating noise, and occasional difficulty with tracking peak torque values that should be within the mechanical capabilities of the device. Additionally, torque sensors, used to provide low level feedback control, are quite expensive, and the methodology discussed above requires direct measurement of ankle torque $T_{meas}$. Accordingly, improvement in the control methodology of an assistive orthosis would be beneficial.

SUMMARY OF THE INVENTION

Embodiments of the invention provide an effective open-loop ankle exoskeleton control scheme capable of meeting or exceeding the performance of closed-loop torque-feedback control. Specifically, embodiments of the invention are directed to methods of providing open loop control for a wearable, exoskeletal assistive orthosis for the ankle. Control is provided on the basis of measured parameters other than direct measurement of torque, i.e., by methods other than feedback control based on torque measured by a torque sensor located at the ankle. In certain embodiments, open loop control of orthosis motor current is provided on the basis of the measurement of force applied between the user's foot at the ground or footbed of the orthosis. In other embodiments, control is provided on the basis of the measurement of both measured force and angular velocity of the ankle.

In one case, a linear relationship is assumed between user-applied torque and desired assistive torque, and then a linear relationship is assumed between this parameter, $T_{set}$, and the actuator motor current (or some other parameter relevant to the force supplied by the actuator). Under these assumptions a linear model is built by directly measuring torque applied by the user to the device using a torque sensor, and measuring an actuator force parameter (e.g., motor current), under a variety of walking conditions. In another case, a more complex relationship is assumed, where the desired actuator force parameter (e.g., motor current), is assumed to vary linearly with both user-applied torque (and therefore the derived $T_{set}$ parameter) and ankle angular velocity. Linear coefficients for this model are then built, again, by measuring applied torque, ankle angular velocity, and motor current, and conducting linear regression on the resulting data. The advantage of these empirical approaches is that they enable good motor current control to achieve desired torque values without the need to deterministically model the complex transmission system that exists between the orthosis actuators and the joint. These method also allow for low level motor control in the absence of a direct measurement of torque, which permits the method to be carried out without the use of a torque sensor.

More generally, embodiments of the invention use regression-based system modeling to establish relationships between delivered torque and prescribed motor current during the exoskeleton's use case—walking at variable speeds. This enables embodying systems to provide an appropriately modeled open-loop current controller capable of meeting and potentially exceeding the performance of closed-loop torque-feedback control. Additionally, certain embodying systems include motor velocity as a model input to increase the responsiveness and therefor the performance of open-loop motor control. According to these methods, motor velocity, combined with the known mechanics and kinematics of the system, permit angle angular to velocity to be calculated, which is then used in the model. In alternative embodiments, angle angular velocity is measured directly, but during construction of the model and during use of the device, to provide a control parameter.

Certain embodiments of open-loop control have advantages over conventional closed loop control. First, systems controlled according to inventive embodiments do not require a torque sensors, which can be expensive and unreliable. Additionally, calibrating exoskeletal assistive devices according to methods set forth herein does not require deterministic modeling of the complex and dynamic mechanical systems that may exist between the controlled motor and the footbed (e.g., pullies, chains, cables, etc.), and instead, the relationship between motor current and torque developed at the ankle can be determined empirically.

Additionally, exoskeleton control that is torque sensorless (i.e., a low-level open-loop based control without a direct measurement of torque) is attractive for commercial-grade devices due to lower cost and reduced mechanical and software complexity, which may limit the potential for system instability and bodily harm. Additionally, once established and properly calibrated, open-loop controllers may require considerably less tuning than closed-loop controllers while at the same time, being adequately adaptive and responsive. Finally, it has been determined that, in practice, open-looped control methodologies described herein provide good responsiveness while reducing motor noise and battery consumption.

In an example embodiment, a method of applying assistive force to the joint of a user wearing a powered exoskeleton orthosis is provided. The method includes receiving a force measurement value from a pressure sensor. The pressure sensor is configured to measure a force applied by a body part of a user. The method further includes determining, from the force measurement value, a torque applied by the body part of the user; determining, on the basis of the applied torque, a desired assistive torque value; determining an actuator drive parameter on the basis of the desired assistive torque value; and driving an actuator in accordance with the actuator drive parameter to cause the motor to apply a motor force to the orthosis to generate an assistive torque across the joint.

In some embodiments, determining the desired assistive torque value includes scaling the torque applied by the user by a scale factor. In some embodiments the assistive torque generated across the joint approximates the desired assistive torque value. In some embodiments, the joint is ankle.

In some embodiments driving the actuator in accordance with the actuator drive parameter to cause the motor to apply the motor force to the orthosis to generate the assistive torque across the joint includes driving the actuator in accordance with the actuator drive parameter without controlling the actuator on the basis of a direct measurement of the torque applied across the joint.

In some embodiments, determining the actuator drive parameter on the basis of the desired assistive torque value includes determining a level of current supplied to a motor connected to provide the motor force to the orthosis to generate the assistive torque across the joint.

In some such embodiments determining the level of current supplied to the motor comprises applying a predetermined linear coefficient to the desired assistive torque value.

In some such embodiments determining the level of current supplied to the motor includes applying a predetermined offset to the desired assistive torque value.

In some such embodiments, the predetermined linear coefficient is determined by linear regression analysis of data comprising measured motor current and measured torque applied to a joint by a wearer of the orthosis under a variety of walking conditions.

In some such embodiments, the data comprising measured motor current and measured torque applied to the joint by the wearer of the orthosis under a variety of walking conditions is collected for a specific gait stage.

In some such embodiments, the data comprising the measured motor current and the measured torque applied to the joint by the wearer of the orthosis under a variety of walking conditions is collected for multiple orthoses having different lengths, and different linear coefficients are generated for different length orthoses.

In another example embodiment a method of applying assistive force to the joint of a user wearing an orthosis is also provided. The method includes receiving a force measurement from a pressure sensor. The pressure sensor is configured to measure a force applied by a body part of a user, to produce a force measurement value. The method further includes determining, from the force measurement value, a measured torque applied by the body part of the user; determining, on the basis of the measured torque, a desired assistive torque value; determining an estimated joint angular velocity; determining an actuator drive parameter on the basis of the desired assistive torque value and the estimated joint angular velocity; and supplying the determined actuator drive parameter to an actuator to cause the actuator to apply a force to the orthosis to generate a torque force across the joint.

In some embodiments the torque force generated across the joint approximates the desired assistive torque value. In some embodiments determining the estimated joint angular velocity comprises one of measuring an angular velocity of two parts of the orthosis and estimating the joint angular velocity on the basis of the velocity of a drive motor.

In some embodiments determining the actuator drive parameter on the basis of the desired assistive torque value comprises determining a level of current supplied to a motor connected to provide the force to the orthosis to generate the assistive torque across the joint.

In some such embodiments, determining the level of current supplied to the motor comprises applying predetermined linear coefficients to the desired assistive torque value and the estimated joint angular velocity.

In some such embodiments, applying the predetermined linear coefficients to the desired assistive torque value and the estimated joint angular velocity includes applying a predetermined first scale factor to the desired assistive torque, applying a second predetermined scale factor to the estimated joint angular velocity, applying a third predetermined scale factor to the product of the desired assistive torque and the estimated joint angular velocity, and applying a predetermined offset.

In some such embodiments, The method of claim 15, wherein the predetermined linear coefficients are determined by linear regression analysis of data comprising measured motor current, measured torque applied to a joint by a wearer of the orthosis, and determined joint angular velocity, taken under a variety of walking conditions. In some such embodiments the data is taken under a variety of walking conditions is collected for a specific gait stage. In some such embodiments, is collected for multiple orthoses having different lengths, and different linear coefficients are generated for different length orthoses.

BRIEF DESCRIPTION OF THE DRAWINGS

The invention will be more fully understood by referring to the following Detailed Description of Specific Embodiments in conjunction with the not-to scale Drawings which may be shown exaggerated or enlarged to facilitate an understanding of the invention, of which.

DETAILED DESCRIPTION OF THE PREFERRED EMBODIMENTS

Figure 1:
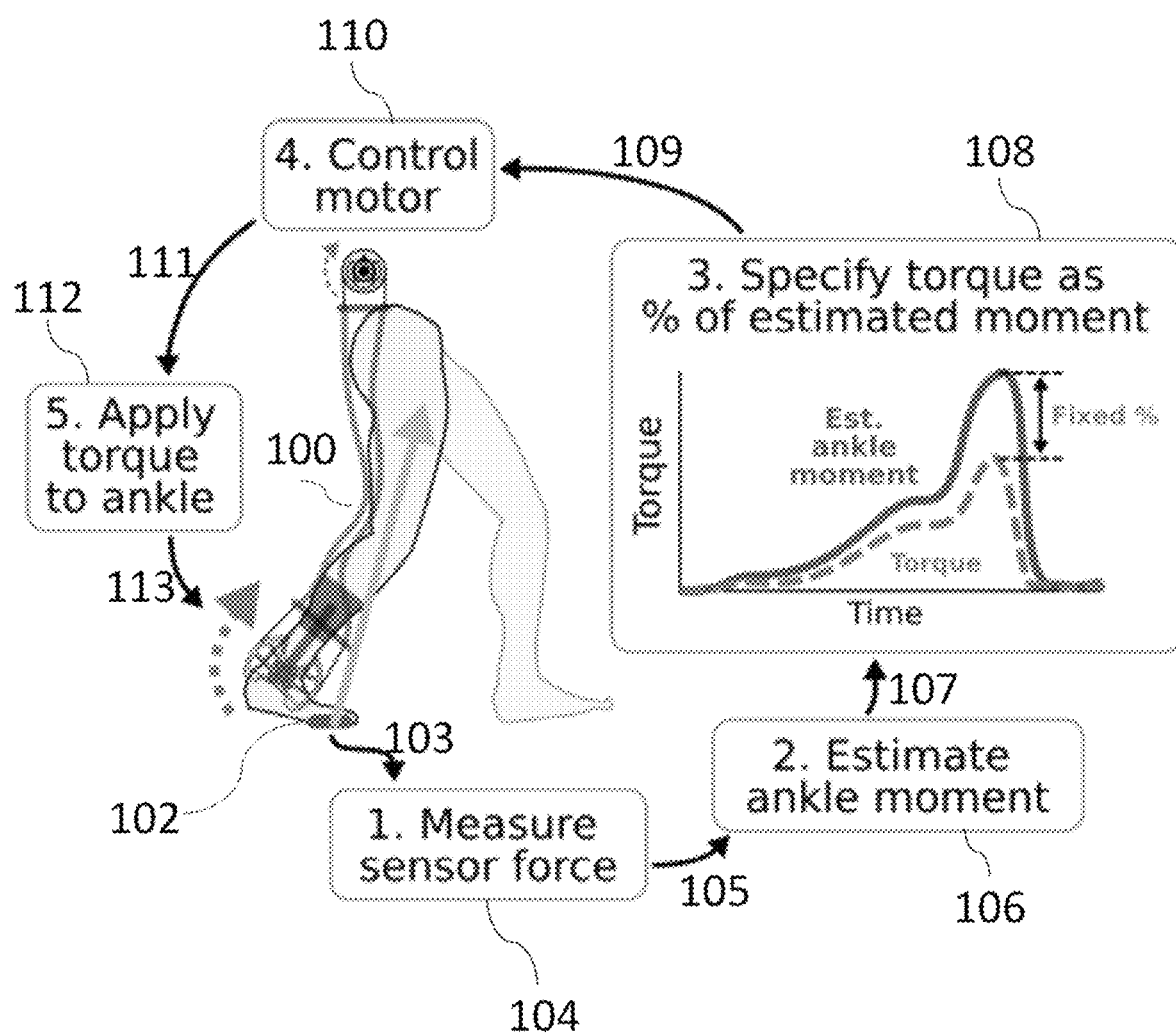
FIG. 1 depicts a schematic visualization of a method of closed-loop control of an assistive exoskeleton.
Figure 2:
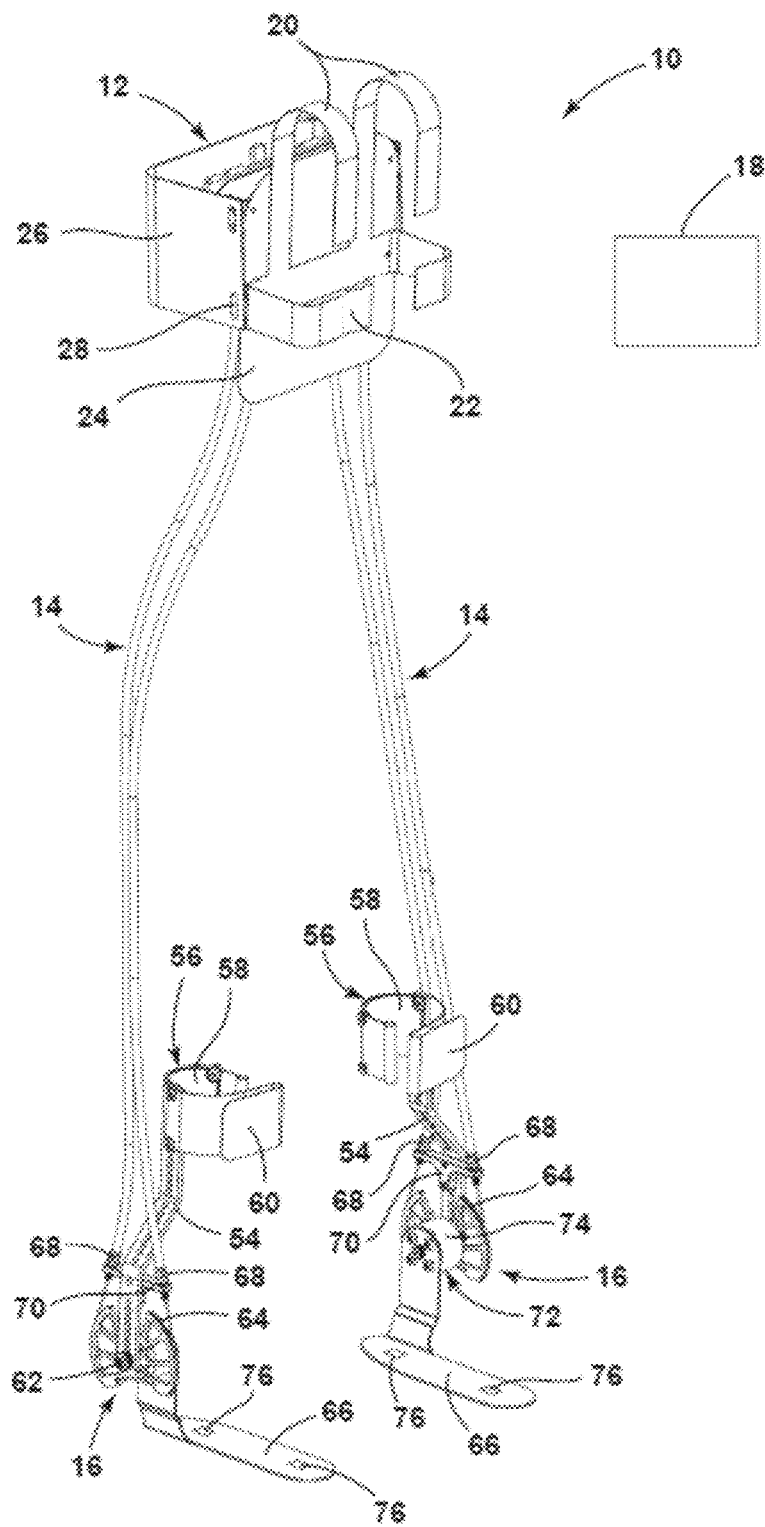
FIG. 2 is a front isometric view of a wearable exoskeleton device; according to some embodiments.
Figure 3:
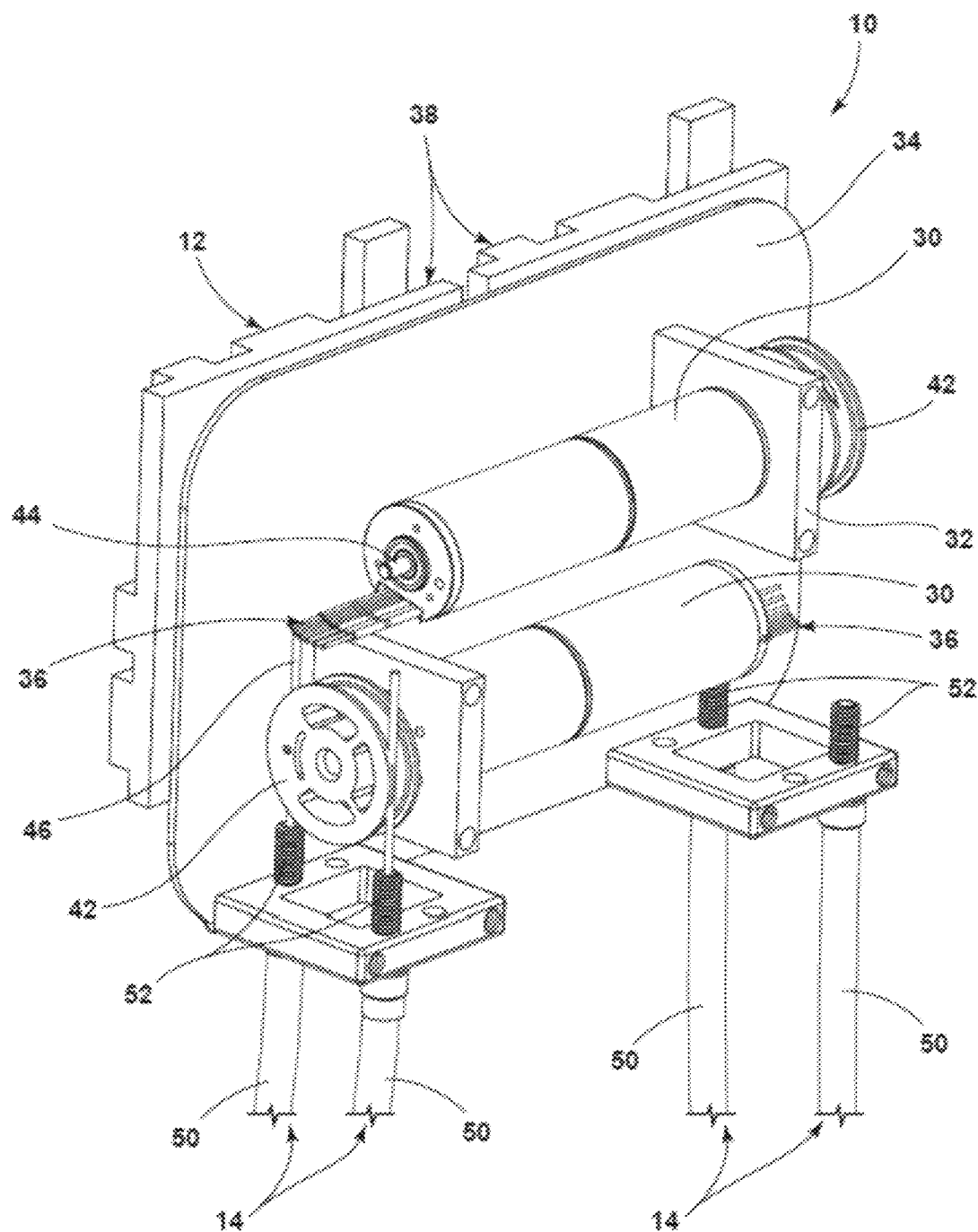
FIG. 3 is a front isometric view of a control unit of the exoskeleton device of FIG. 3, according to some embodiments.
Figure 4:
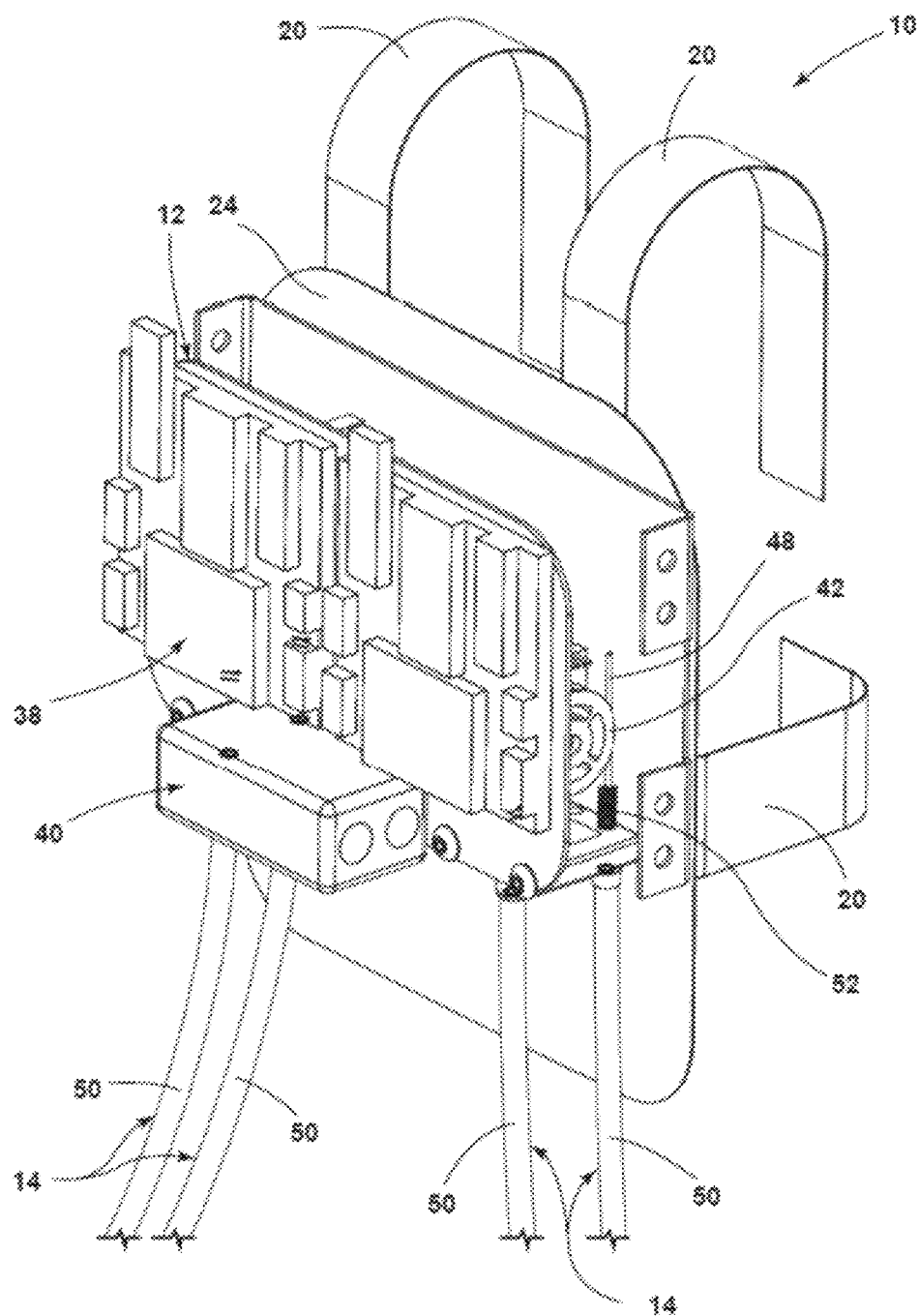
FIG. 4 is a rear isometric view of the exoskeleton device of FIG. 3, according to some embodiments.
Figure 5:
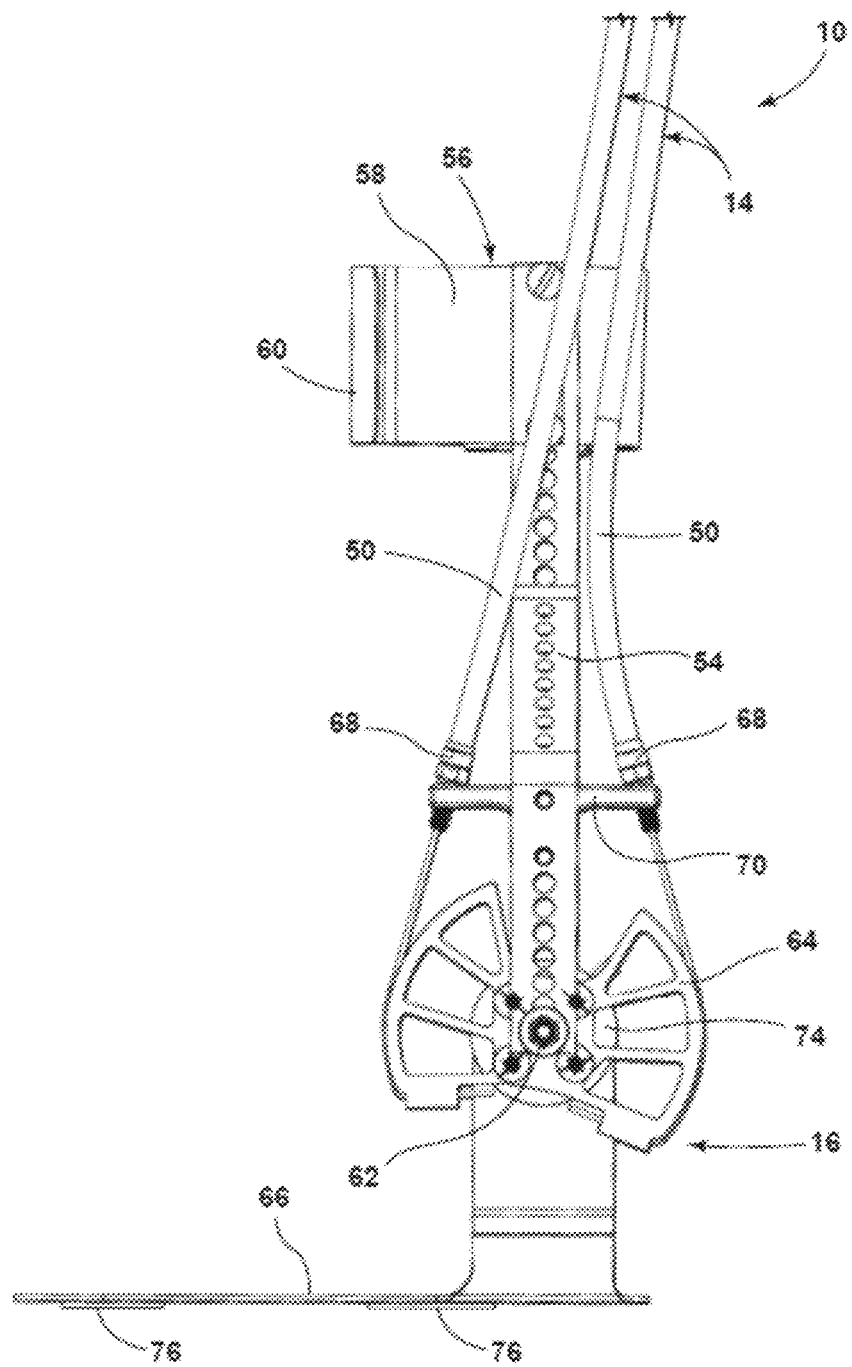
FIG. 5 is a side plan view of a lower hinged assembly that is operably coupled with the control unit through a transmission assembly, according to some embodiments.

Referring now to FIG. 2-6, there is shown an embodiment of an exoskeleton device, usable with certain control methodologies according to the invention. In some embodiments, the exoskeleton device may provide assistance during some modes of operation intended to improve mobility or posture in the form of linear force and/or rotational force (i.e. torque). Alternatively, the exoskeleton may provide resistance a mode of operation designed to increase muscle recruitment during a function task (e.g. walking) in the form of linear force and/or rotational force (i.e. torque). The assistance or resistance may be provided to various hinged assemblies of the exoskeleton device. The electronic assistance may be provided by a powered ankle-foot orthosis (AFO), a knee assembly, and/or any other joint assembly that is coupled with a control unit through a transmission assembly. For example, FIGS. 2-6 illustrate various embodiments of the exoskeleton device 10 that includes a control unit 12, a transmission assembly 14, and a pair of hinged assemblies 16. In the illustrated embodiment, the exoskeleton device 10 includes two lower hinged assemblies 16 for a right foot and a left foot of a user. Each of the lower hinged assemblies 16 is configured as an AFO.

In some embodiments, the exoskeleton device 10 may also include a feedback modality 18 for providing feedback regarding the individual's use of a wearable exoskeleton device 10 in a free-living environment. In some instances, a method for providing feedback to an individual using a prosthesis utilizes a computer monitor mounted at line-of-sight in front of a treadmill that provides a near real-time visual display of desired biomechanical parameters and the individual's compliance or non-compliance with these parameters. However, as can readily be determined, this type of feedback can be incompatible with use outside of a rehabilitation facility and in free-living settings. Accordingly, in some embodiments, the exoskeleton device 10 may utilize other methods for providing feedback that include auditory feedback via speakers or headphones or earbuds, vibrotactile feedback via small vibration actuators, and/or wearable visual feedback via body-worn displays (e.g. wrist mounted monitor or LEDs).

In the embodiment illustrated in FIGS. 2-6, the control unit 12 includes attachment straps 20 used to attach the control unit 12 to a user (e.g. along a user's back). In some examples, the straps 20 may include first and second vertical straps along with a waist strap. Any of the straps 20 may be attached to one another on one or both end portions thereof. Moreover, the waist strap may include a buckle 22 that allows for engagement of two end portions of the strap and adjustability as to the length of the strap 20. The straps 20 may be flexible or rigid. The attachment straps 20 may additionally or alternatively be of a waist strap form, a backpack form, or any other structure for supporting weight on the user's waist, torso, or other attachment site.

In the embodiment of FIGS. 2-6, the attachment straps 20 are operably coupled to a base plate 24. The base plate 24 may provide a surface for mounting or supporting components of the control unit 12 such as a housing shell 26, which may serve to cover or protect internal components of the control unit 12 from direct view or interference. The housing shell 26 may include be formed from covering material (e.g. plastic, aluminum, cloth) suitably arranged to cover the control unit 12 and can have any design disposed thereon. The base plate 24 may be coupled to the housing shell 26 by a plate-to-housing attachment feature 28. This plate-to-housing attachment feature 28 may include correspond engagement features and/or removable fasteners, with examples including bolts, magnets, clips, and slots. In some embodiments, the base plate 24 and the housing shell 26 may be embodied as an integral component, which may include a single piece or multiple pieces.

The control unit 12 may include one or more actuators 30 that can be supported on the actuator base plate 24. The one or more actuators 30 may generate force through a rotary electric motor, linear electric motor, hydraulic piston, pneumatic piston, pneumatic bladders, combinations thereof, and/or any other device capable of generating a force. The one or more actuators 30 are coupled to the base plate 24 through one or more brackets. The one or more actuator brackets 32 may be formed from a metallic, polymeric, or other suitable material for securing the one or more actuators 30 to the base plate 24. A top plate 34 may be positioned on an opposing side of the one or more actuators 30 from the base plate 24. The one or more actuator brackets 32 may attach to the base plate 24, the one or more actuators 30, or to the top plate 34 through removable or non-removable fasteners (e.g., bolts, clips, slots).

Actuator wiring 36 may electrically couple with the one or more actuators 30 and is configured to carry electrical power or electrical control signals to and from the one or more actuators 30 to a circuit board 38 and/or components thereof. The one or more circuit boards 38 may include one or more printed circuit boards (PCBs), mounting one or more circuits or chips, for performing one or more functions described herein. The one or more circuit boards 38 may be removably or non-removably coupled to the top plate 34 through fasteners, such as bolts, clips, slots, or other fasteners. In an alternate embodiment, the one or more circuit boards 38 may be coupled to one or more other components within the control unit 12.

The circuit board can include various electrical components, such as memory, processors, controllers, transceivers, and/or any other device. The various electrical components may have power supplied thereto by one or more batteries that are also supported by the control unit. For example, in the embodiment illustrated in FIGS. 2-6, one or more batteries 40 are coupled to the top plate 34, to the circuit board 38, or to any other component of the control unit 12 by removable or non-removable attachments (e.g. brackets or bolts). The one or more batteries 40 may be any device capable of storing and delivering electrical power, with examples including nickel cadmium, nickel metal hydride, lithium ion, lead acid, alkaline, lithium batteries, and so on. The one or more batteries 40 may be rechargeable or single use. The control unit 12 may further include circuitry and components for connecting and rectifying external electrical power received from external sources to recharge the one or more batteries 40, in some embodiments.

The first actuator can include a first shaft extending therefrom and the second actuator includes a second shaft extending therefrom, the first and second shafts extending in substantially opposing directions within the control unit. Each actuator can be coupled to one or more pulleys or other devices for assisting in translating movement of the actuator to a movement in a different direction. For example, in the embodiment illustrated in FIGS. 2-6, one or more actuator pulleys 42 are double-wrap side-hole pulleys. The pulleys 42 are generally axially aligned with a shaft 44 of the actuator 30 and rotates in conjunction with each respective actuator 30. In some embodiments, the one or more actuator pulleys 42 may be any suitable device for transferring force from the one or more actuators 30 to a transmission assembly 14.

The force generated by the one or more actuators can be carried by one or more transmission elements of the transmission assembly. The transmission elements are configured to provide force to various elements of the exoskeleton device that can be remote from the control unit. For example, cams, linear shafts, pistons, universal joints, and other force-transferring linkages may be implemented. In embodiment illustrated in FIGS. 2-6, the transmission assembly 14 includes one or more extension cables 46 and one or more contraction cables 48. The extension cables 46 and contraction cables 48 may be arranged to transfer opposing forces due to the suitability of cables for transferring "pulling" forces but not for transferring "pushing" forces. In some embodiments, a single transmission element may be used to transfer opposing (both pushing and pulling) forces.

In the embodiment of FIGS. 2-6, the transmission assembly 14 is routed down one or more legs of a user to reach the lower hinged assembly 16. In the illustrated example, the transmission assembly 14 is lightweight and flexible so as to allow minimal impediment of motion of the knee and hip joints of a user. The AFO may include one or more lubricating fluids or materials, disposed on an element or between two relatively-moving elements to reduce friction and increase efficiency. The extension cables and contraction cables may be formed from any suitable material, with examples including metal, Kevlar, and nylon.

The one or more extension cables and one or more contraction cables may each be housed in a cable sheath. The one or more cable sheaths may serve to support and house the extension cables and contraction cables. In the embodiment illustrated in FIGS. 2-6, the extension cables 46 and contraction cables 48 may be Bowden cables that transfer force via the movement of inner cables relative to a hollow sheath 50 or housing containing the inner cable. The one or more cable sheaths 50 may each be coupled to barrel adjustors 52. The barrel adjustors 52 allow for adjustment of the length of the sheaths 50 to adjust a baseline tension of the extension cables 46 or contraction cables 48. The one or more barrel adjustors 52 may be further coupled to the one or more cable brackets.

In the embodiment illustrated in FIGS. 2-6, each lower hinged assembly 16 includes an upright member 54 that serves as a mounting or support element for the components of the lower hinged assembly 16. Each upright member 54 may be additionally coupled to an orthotic cuff 56. The orthotic cuff 56 may be additionally coupled to a D-ring strap 58 and a Velcro strap 60. The orthotic cuff 56, D-ring strap 58, and Velcro strap 60 may be considered together as an attachment mechanism for coupling the lower hinged assembly 16 to a leg of a user at an attachment site, which may be between an ankle and a knee of the leg of the user.

Each upright member 54 may be additionally coupled to a bearing 62 or joint proximate an opposing end portion from the orthotic cuff 56. The one or more bearings 62 may each be coupled to a sprocket 64. Each of the one or more bearings 62 may serve as a freely-rotating and load-bearing connection between the upright member 54 and the sprocket 64. Each collection of an upright member 54, a sprocket 64, and a bearing 62 may be operably coupled to one another through connecting hardware, such as bolts and nuts or other suitable connecting hardware. The connecting hardware may be disposed through various adjustment holes defined by the upright member 54 for adjustability of the lower hinged assembly 16 based on the user's body type.

In some embodiments, additional brackets are attached to the lower hinged assembly based on the joint that is to be assisted. For example, as illustrated in FIGS. 3-6, one or more insole brackets 66 may be rotatably coupled with the upright member 54. The insole brackets 66 support the foot of the user and received torque that is to be applied to a walking surface of the user. The one or more insole brackets 66 may be formed from a metallic material, a polymeric material, and/or any other suitable rigid material. The one or more insole brackets 66 may be configured to be inserted into a user's footwear using thin elements without external straps.

The cable sheaths 50 may be coupled to the lower hinged assembly 16 by lower barrel adjusters 68 to anchor the lower end portions thereof. The lower barrel adjustors 68 may provide adjustment of the length of the sheaths 50 thereby providing adjustment of the baseline tension of the extension cables 46 or contraction cables 48. The one or more barrel adjustors 68 may be mounted on a support block 70. The one or more support blocks 70 may each be additionally coupled to the upright member 54.

After passing through the barrel adjusters 68 and exiting their sheaths 50, the extension cables 46 and the contraction cables 48 may couple to the sprockets 64. The sprockets 64 may clamp to each of the extension cables 46 and the contraction cables 48 on a first end portion and coupled to a single actuator pulley 42 in the control unit 12 on a second end portion. An alternate embodiment may comprise one or more chain components attached to one or more ends of one or more plantarflexion cables 46 or dorsiflexion cables 48. The one or more chain components may be additionally coupled to at least one of sprockets 64 or a motor pulley 42. Such a chain may serve as a flexible force-transferring linkage connecting a sprocket 64 or pulley 42 to a cable 46, 48, and thereby would allow actuation of the cable (46 or 48) without requiring the cable to bend around the radius of the sprocket 64 or motor pulley 42.

In various embodiments, an opposing pair may instead embodied in a single element with the capability to transfer both positive and negative forces. In some embodiments, the sprocket 64 may include any device for capturing force from a transmission assembly 14 to produce torque between two or more attachment points with at least one attachment point on each side of a user's joint (e.g., torque between the insole bracket 66 and the orthotic cuff 56).

Each upright member 54 and insole bracket 66, taken in combination, may be considered as a force-applying arm applying torque around an axis. In some instances, the axis is generally aligned with a body joint axis (e.g. an ankle joint axis). When a force is applied along a length of extension cables 46 or contraction cables 48, a force is applied to sprocket 64 and, in turn, insole bracket 66. Accordingly, the forces applied along the lengths of extension cables 46 and contraction cables 48 apply a force causing insole bracket 66 to rotate about the bearing 62 with respect to upright member 54.

In various embodiments, the extension cables 46 and/or the contraction cables 48 can be actuated based on acquired data from one or more sensors 72 within the exoskeleton device 10 in reference to use of the hinged assembly. As provided herein, one or more performance metrics may be determine based on the acquired data, which may include at least one of a posture position, joint positions/angles, instantaneous, time varying, or average force applied between the foot and the ground or footplate, joint moment, joint movement velocity (i.e., ankle angular velocity), joint power, or spatiotemporal parameters of walking, including step/stride length and gait speed. In some examples, the one or more sprockets 64 may each be additionally coupled to a torque sensor 74 or a joint angle encoder configured to measure an angle at some point during an individual's gait cycle as the data point. The torque sensor 74 may be used to sense the torque force applied by the exoskeleton device 10 for assistance. The torque sensor 74 may be additionally coupled to the insole bracket 66. In some embodiments, the one or more sprockets 64 may be coupled to the corresponding one or more insole brackets 66 without an intermediate torque sensor 74. Additionally or alternatively, in various embodiments, the sensor 72 may be configured as one or more accelerometers coupled the lower hinged assembly 16 to provide information on the user's gait. In some embodiments, torque sensor 74 is omitted.

In some embodiments, the sensor 72 may be configured as one or more pressure/force sensors 76 may also be operably coupled with the insole bracket 66. The one or more pressure/force sensors 76 may be positioned on an upwardly and/or a downwardly facing surface of the insole bracket 66 in various embodiments to provide spatial pressure information across the foot surface. The one or more pressure/force sensors 76 may include force-sensitive resistors, piezoresistors, piezoelectrics, capacitive pressure sensors, optical pressure sensors, resonant pressure sensors, or other means of sensing pressure, force, or motion.

The control unit containing the circuit board may include various electrical components for actuating one or more of the actuators 30. In turn, the actuators 30 provide force that is transmitted to one or more upper or lower hinged assemblies through the transmission assembly. In the embodiment illustrated in FIG. 6, the control unit 12 includes a controller 78 having a processor 80 and memory 82 that is powered by the power supply. Logic 84 is stored within the memory 82 and includes one or more routines that is executed by the processor 80, such as the methods described below, e.g., in connection with FIGS. 7A-B. The controller 78 includes any combination of software and/or processing circuitry suitable for controlling various components of the exoskeleton device 10 described herein including without limitation processors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. All such computing devices and environments are intended to fall within the meaning of the term "controller" or "processor" as used herein unless a different meaning is explicitly provided or otherwise clear from the context.

Figure 6:
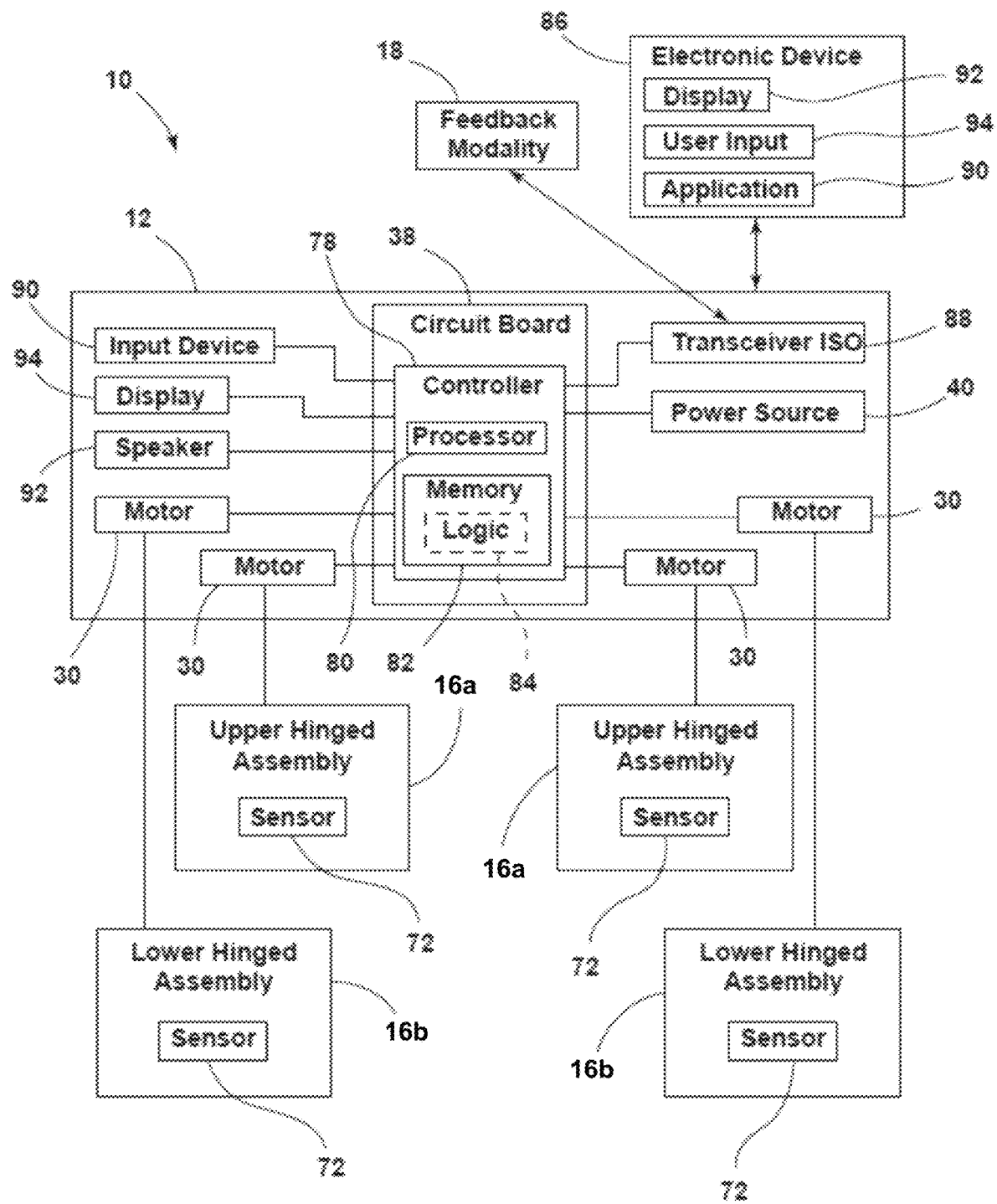
FIG. 6 is a block diagram of the exoskeleton device, according to some embodiments.

In some examples, more than one joint on a common limb may be assisted by the exoskeleton device and activated/deactivated by the controller. For example, in some instances, the exoskeleton device may provide assistance to any one or more of an ankle, a knee, and/or a hip of a user. In the embodiment of FIG. 6, the exoskeleton device 10 includes the control unit 12, a pair of upper hinged assemblies 16a and a pair of lower hinged assemblies 16b. The pair of upper hinged assemblies 16a may be positioned proximately to respective knees of a user while the lower hinged assemblies 16b may be positioned proximately to the user's respective ankles. In some examples, the exoskeleton device 10 may include any number of upper hinged assemblies 16a and/or lower hinged assemblies 16b depending on the assistance to be provided to the user.

In the embodiment illustrated in FIG. 6, the control unit 12 includes four actuators 30 that respectively control one of the upper and/or lower hinged assemblies 16a, 16b. In some embodiments, a first actuator 30 can provide a first level of assistance and the second actuator 30 can provide a second level of assistance. The first level of assistance can be greater than, equal to, or less than the second level of assistance during different phases in which the exoskeleton device 10 is used.

In some instances, a transmission may include various gear ratios that allow for more than one upper or lower hinged assembly 16a, 16b to be controlled by a common actuator 30. The actuators 30 may be disposed in an offset relationship from one another such that the transmission assemblies 14 extending from each of the actuators 30 towards the upper or lower hinged assemblies 16a, 16b and free of contact from one another within the control unit 12. It will be appreciated that the upper and lower hinged assemblies 16a, 16b illustrated in FIG. 6 may include any of the components described herein.

The control unit 12 may further include a display 94 for providing the status of the operation of the exoskeleton device 10 and/or operational data. The control unit 12 may further include an input device 90 for accommodating various user inputs and/or a speaker 92, which may also be operably coupled with the control unit 12, for notifying a user of any desired condition.

As provided herein, any of the upper and lower hinged assemblies 16a, 16b can include any type of sensor 72, which may communicate with the control unit 12 in a wired and/or wireless manner. For example, like the lower hinged assemblies 16b, the upper hinged assemblies 16a may also include a torque sensor 74. The torque sensor 74 may be used to sense the torque force applied by the exoskeleton device 10 for assistance. Additionally or alternatively, in various embodiments, one or more accelerometers may be coupled to the upper and/or lower hinged assemblies 16a, 16b to provide information on the user's gait. Additionally, angle sensors along the exoskeleton device 10 can measure various angles during a gait cycle and may include potentiometers, encoders (e.g., optical encoders), and the exoskeleton device 10 employing a light source and a light detector capable of calculating an angle of the exoskeleton device 10. Sensors such as inertial measurement units (IMUs) may also be used to determine acceleration, velocity, position, and orientations on one or more segments of the exoskeleton device 10 or biological limbs.

In some examples, the exoskeleton device 10 may communicate via wired and/or wireless communication with the feedback modality 18 and/or one or more handheld or electronic devices 86 through a transceiver 88. The communication may occur through one or more of any desired combination of wired (e.g., cable and fiber) and/or wireless communication mechanisms and any desired network topology (or topologies when multiple communication mechanisms are utilized). Exemplary wireless communication networks include a wireless transceiver 88 (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, cellular, satellite, microwave, and radio frequency, providing data point communication services.

The electronic device 86 may be any one of a variety of computing devices and may include a processor and memory. The memory may store logic having one or more routines that is executable by the processor. For example, the electronic device 86 may be a cell phone, computer, mobile communication device, key fob, wearable device (e.g., fitness band, watch, glasses, jewelry, wallet), apparel (e.g., a tee shirt, gloves, shoes or other accessories), personal digital assistant, headphones and/or other devices that include capabilities for wireless communications and/or any wired communications protocols. The electronic device 86 may have an application 91 thereon and a display 95 may provide a graphical user interface (GUI) and/or various types of information to a user. The operation of the various components of the exoskeleton device 10 may be altered through the usage of the application 91 and/or information regarding the operation of the components may be provided on the display 95. The electronic device 86 may likewise have any combination of software and/or processing circuitry suitable for controlling the exoskeleton device 10 described herein including without limitation processors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth.

In some embodiments, the electronic device 86 may be configured to receive user inputs via the input circuitry 93. For example, the inputs may relate to an amount of assistance to be provided by the exoskeleton device 10 or any other information and/or commands. In response, the controller 78 may activate/deactivate the one or more actuators 30 to produce force equating to the desired amount of assistance. Accordingly, usage of the exoskeleton device 10 may be varied through the usage of the application 91 in addition to or in lieu of usage of the input device 90. Additionally or alternatively, the electronic device 86 may also provide feedback information, such as visual, audible, and tactile alerts. The feedback information may be provided for any reason, including but not limited to, additional assistance being needed, less assistance being needed, a set number of cycles being reached, a predefined goal being accomplished, etc. The feedback information may be at least partially determined by the sensors 72, which may include by torque sensors 74, pressure/force sensors 76, motor velocity sensor(s) located at the motors/actuators, ankle angular velocity sensors, and/or any other sensor within the exoskeleton device 10.

In some embodiments, the controller 78 operates a finite state machine to control the operation of the actuators 30 to provide assistance to a user. For example, the state machine implemented by the controller 78 may define a number of different states, including early stance, late stance, and swing phases of the user's gait or step cycle that, in turn, control which of the actuators 30 is operated to apply force to either extension cables 46 (FIG. 2) or contraction cables 48 (FIG. 2) to provide force assistance to the wearer. For example, when a pulling force is applied to a lower hinged assembly 16b by extension cables 46 through the actuators 30, a torque is applied to the sprocket 64 (FIG. 2) causing the insole bracket 66 (FIG. 2) to be rotated downwards with respect to the upright member 54 (FIG. 2) thereby assisting the user in moving their toes downwards (i.e., extension). Conversely, when a pulling force is applied to contraction cables 48 by actuators 30, a torque is applied to sprocket 64 causing the insole bracket 66 to be rotated upwards with respect to the upright member 54 thereby assisting the user in moving their toes upwards (i.e., contraction). In this manner, the upright member 54 and the insole bracket 66 operate as first and second arms of a hinged connection at the user's joint. The first arm of the hinge (e.g., the upright member 54) is fixed to the user's limb (e.g. by orthotic cuff 56 around the lower leg), while the second arm of the hinge (e.g., insole bracket 66) is positioned along a user's foot. Similarly, the actuators 30 may assist in extension and contraction of the upper hinged assembly 16b proximate to a user's knee to provide assistance to such joints during various portions of the gait cycle.

The state machine may receive input from one or more sensors 72, and use current and previous input values in order to determine a current state of the state machine. The current state is then used to determine the timing of the actuator 30 activation, in order to provide torque assistance to the user with appropriate timing and intensity (e.g., to provide extension assistance during toe-off, or contraction assistance during foot swing to prevent drop foot).

Figure 7A:
FIG. 7A is a photograph of an exoskeleton device according to an inventive embodiment.
Figure 7B:
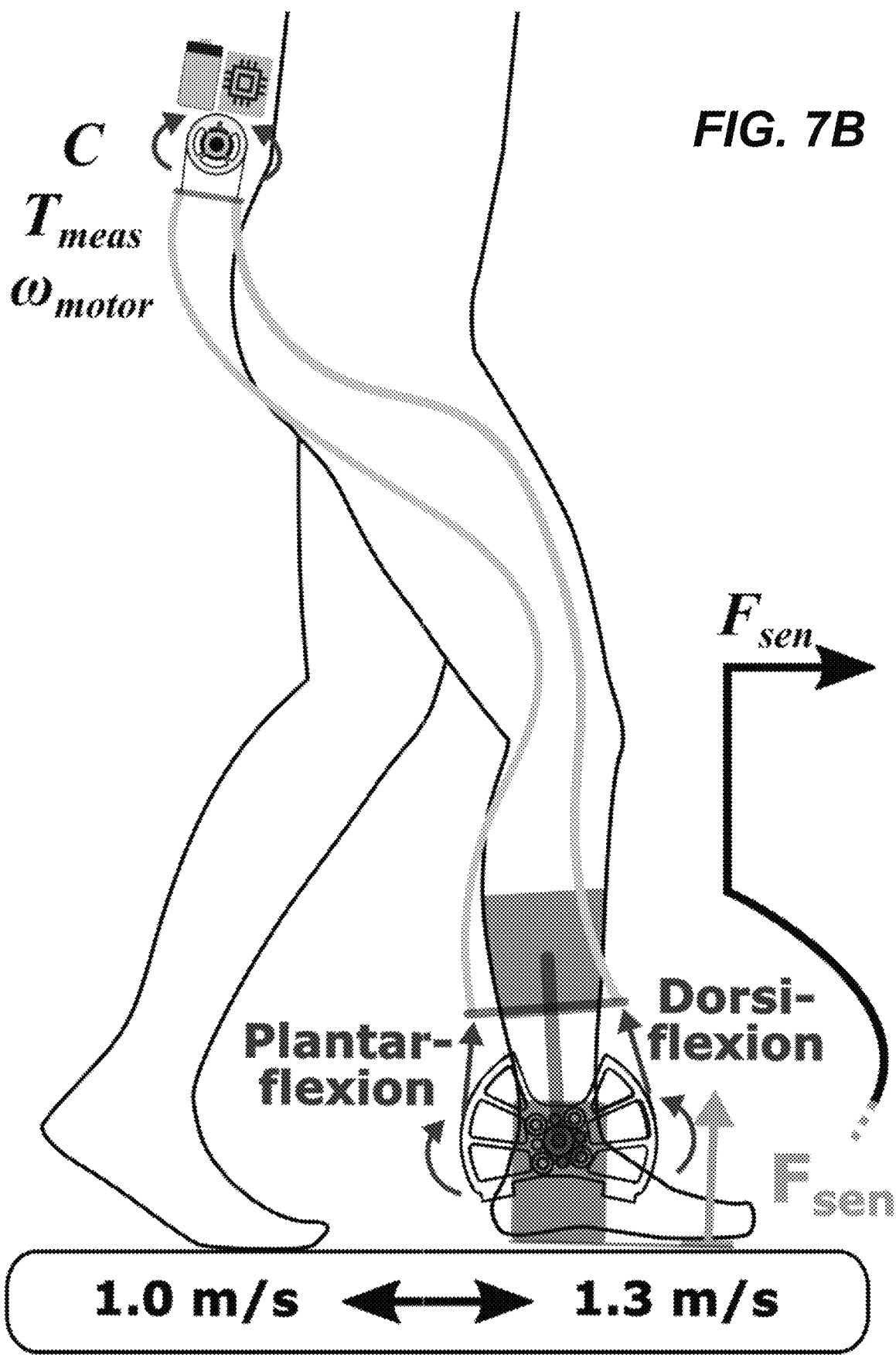
FIG. 7B is a schematic visualization of exoskeleton function and an experimental setup utilizing a treadmill at typical adult walking speeds.
Figure 7C:
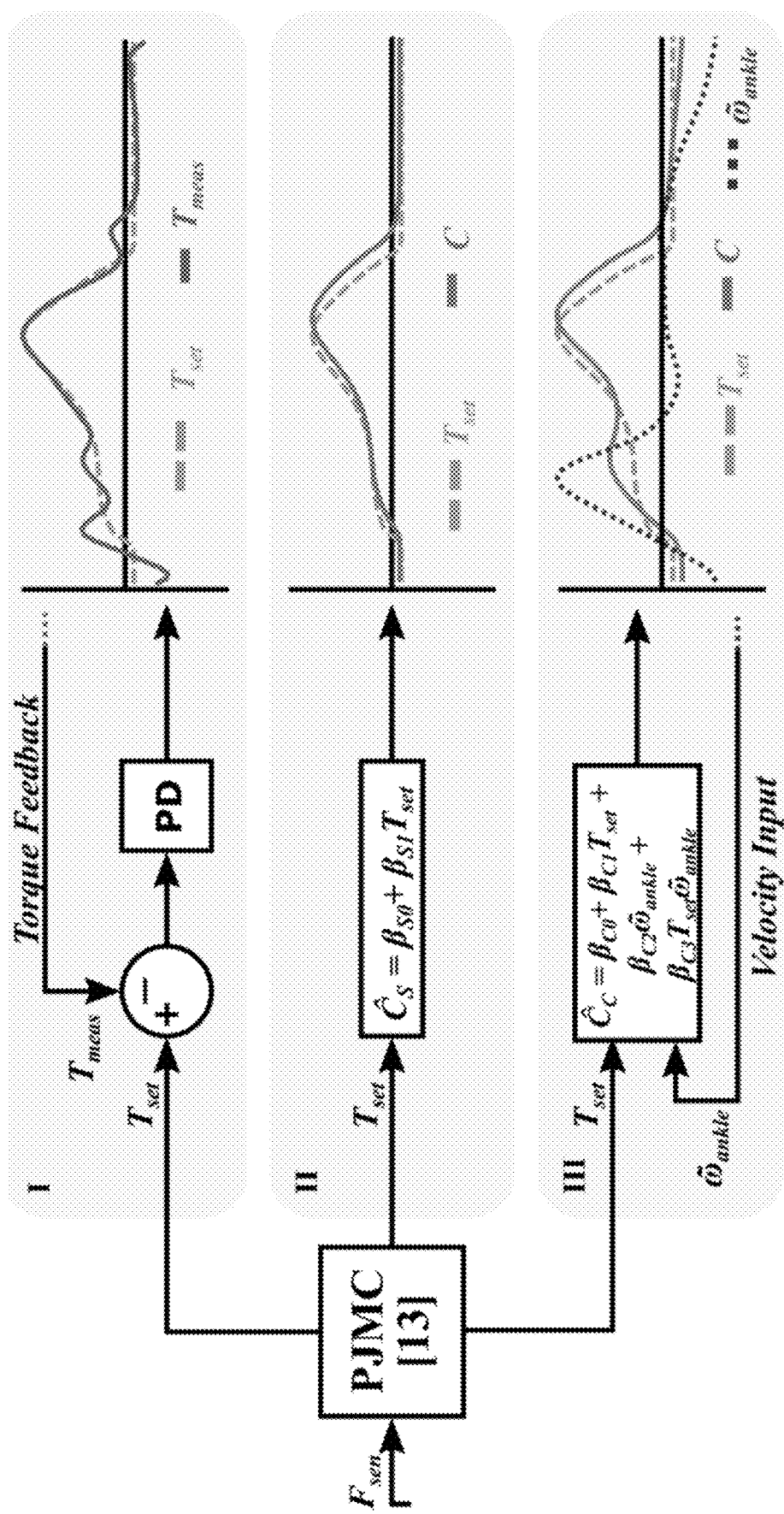
FIG. 7C depicts simplified block diagrams of closed- and open-loop control schemes and corresponding plots of experimental data demonstrating the variability in control objective, input, and output signals.

Referring now to FIGS. 7A-C, embodiments of the invention are directed to various control methodologies for an assistive exoskeleton device, for example, the device described above in reference to FIGS. 2-6. FIG. 7B shows a schematic visualization of exoskeleton function when the device is used, e.g., walking overground or on a treadmill at various speeds. The setup depicted in FIG. 7B may be used both for calibration of the control parameters of the device, and for validating the resulting model. As can be seen, force-sensitive resistors (i.e., sensors 76 described above) in the footplate are configured to detect gait state transitions, and to measure and/or estimate the amount of instantaneous force and/or pressure the user of the device is imparting to the ground. The device may also include sensors for directly measuring torque applied at the ankle (i.e., between the ankle and the upright member), the angular velocity of the angle (or approximating the angular velocity of the angle by measuring the angular velocity between the floorplate and the upright member, and motor velocity. Some or all of these sensors may be used during calibration steps when the control model is being built, and some of these sensors may be omitted during use of a calibrated device being controlled according to methods described herein. In particular, it is contemplated that direct measurement of ankle torque (by a torque sensor), and motor speed is not done in certain embodiments, permitting omission of these sensors in marketed devices.

Referring now to FIGS. 7B and 7C, high level control (i.e., determination of the desired torque signal) may be provided by application of a proportional joint movement control (PJMC) routine. The PJMC routine defines the assistance profile $T_{set}$ from the instantaneous force reading $F_{sen}$. $T_{set}$ is a determination of the assistive torque to be provided by the device, and is determined by calculating an estimate of user supplied torque (on the basis of $F_{sen}$ and the known geometry of the device), and then scaling the user supplied torque by a scaling factor. This scaling factor may vary depending on a number of parameters, such as user desired assistance, gait phase, and walking speed and walking conditions (i.e., going uphill, downhill or stage). The determination of $T_{set}$ is described in additional detail below. Motors mounted at the upper leg, hip, waist, or torso are used to actuate Bowden cables and rotate a pulley to plantar- or dorsi-flex the ankle joint with the determined level of assistive torque. In certain embodiments, a torque sensor at the ankle measures may measure torque $T_{meas}$ at the ankle. On-board sensing and calculations yield motor current C and estimated ankle angular velocity $\tilde{\omega}_{ankle}$ from the motor driver output.

Referring now to FIG. 7C, there is shown a simplified block diagrams of low-level closed- and open-loop control schemes (i.e., control of the motor to track the desired torque) and corresponding plots of experimental data demonstrating the variability in control objective, input, and output signals. The methods schematically illustrated in I-III may be used, singly or in combination, to provide low level motor control in order to ensure that a desired $T_{set}$ is provided by the device described above. As shown, a closed-loop torque control, relying on a torque sensor at the ankle of the device, (I) sets motor current so as to minimize error between $T_{meas}$ and $T_{set}$ using a PD controller. A simple open-loop motor current control (II) predicts a current setpoint $\hat{C}_S$ from $T_{set}$ only. A complex open-loop current control (III) predicts a current setpoint $\hat{C}_C$ from $T_{set}$, real-time velocity input $\tilde{\omega}_{ankle}$, and the interaction of the two signals. $\beta_i$ are coefficients determined from generalized linear regression. Here, $\tilde{\omega}_{ankle}$ may be measured directly with an angular velocity sensor that measures the angular velocity between the footplate of the device and its upright member, a user's leg, or some other position, or it may be estimated on the basis of calculations relying on the motor velocity and the mechanics of the transmission system. Desired assistance profiles for all control schemes may be communicated to motor drivers via pulse width modulation.

The control methodologies introduced above in connection with FIG. 7C will now be described in additional detail.

In one embodiment, the invention is directed to a method of controlling an ankle exoskeleton (e.g., a battery and powered and wireless ankle exoskeleton) designed to provide both plantarflexion (PFX) and dorsiflexion (DFX) assistance. An example of such a device is discussed above in reference to FIGS. 2-6. In this design, brushless DC motors (EC4-Pole, Maxon) are worn around the waist actuated Bowden cables that subsequently rotate a pulley at the ankle joint (see FIGS. 7A-B). The pulley is mounted to a carbon fiber footplate that rotates relative to a carbon fiber calf cuff. A torque sensor between the pulley and footplate may be provided, in some embodiments, which measures applied torque and, in the case of closed-loop control, provides feedback to a control unit. See FIG. 7C(I). In the case of open loop control, the torque sensor is not necessary once a unit has been calibrated as set forth below. The control unit may include a microprocessor, motor drivers, signal processing chips, and a Bluetooth module. Force-sensitive resistors (FSRs) on the footplate detect gait events, and inform a simple state machine to appropriately shift between PFX and DFX assistance during the stance and swing phases of walking (see FIG. 7C).

High level motor control may be provided by determining an assistance profile as a fraction of user-supplied torque to the device. Specifically, an exoskeleton assistance profile is controlled by an instantaneously-adaptive Proportional Joint Moment Controller (PJMC), which prescribes the desired or setpoint torque ($T_{set}$) as a function of force measured by the FSRs, according to:

$$T_{set} = T_0 \frac{F_{sen}}{F_{ref}} \quad (1)$$

Here, $F_{sen}$ is the real-time FSR reading, and $F_{ref}$ is the average peak FSR reading during a baseline calibration. The instantaneous sensor force ratio is scaled by a desired peak torque setpoint $T_0$ (e.g., 15 Nm) to adapt assistance based on the ankle demand across variable walking conditions. $T_0$, in some embodiments, is a user-set parameter that may be adjusted on the basis of the degree of desired assistance. In some embodiments $T_0$ is variable depending on walking conditions (e.g., going up or down stairs or other inclines/declines, walking more quickly or more slowly, carrying loads, etc.). In some embodiments, $T_0$ is variable on the basis of gait stage, which may be determined on the basis of force measurements from an array of FSR sensors placed in different locations on the footbed.

In the case of closed-loop control (FIG. 7C, case I), a PD controller tracks $T_{set}$ based on ankle torque ($T_{meas}$) measured from an embedded torque sensor. Generally, PD gains are appropriately tuned to minimize overshoot and oscillation between delivered (and therefore measured) torque and the desired torque.

Exemplary data showing $T_{set}$ and $T_{meas}$ for a device controlled according to this closed-loop control methodology during walking is shown in FIG. 7C. As can be seen, closed-loop control does a good job of minimizing the error between $T_{set}$ and $T_{meas}$ throughout the walking motion, which is why it is regarded as the "gold standard" of conventional control methodologies of devices like that described above.

As an alternative to closed-loop control by directly tracking $T_{meas}$, in alternative embodiments, cable-driven robot control and exoskeleton control is provided by open loop methodologies that do not require or rely on feedback provided by an ankle torque sensor during operation. These open loop methodologies are capable of accurately prescribing the desired torque signal, which, in some embodiments, may be the high-level adaptive assistance torque from PJMC. These methods start with detailed empirical characterization, by easily measured parameters, of the exoskeleton interacting with the user during walking. Instead of attempting to develop and validate an analytical or deterministic model of the exoskeleton system dynamics coupled with complex human interaction, these embodiments rely on empirical models built through experimental characterization of the system in operation to relate desired motor current to more easily measured parameters.

To develop such models, a basic open-loop current controller was used to collect experimental data for empirically predicting motor current as a function of ankle torque alone or both ankle torque and motor velocity during walking events across a range of speeds and PFX assistance levels. Motor current to produce a desired torque will generally be directly proportional to desired torque and inversely proportional to various system losses. Thus, the basic open-loop current controller specified motor current ($C_{set}$) as follows:

$$C_{set} = T_{set}(\tau_m r_{gb} r_p \varepsilon_{mgb})^{-1} \quad (2)$$

Here, the torque setpoint ($T_{set}$) is divided by the motor torque constant ($\tau_m$), gearbox and pulley gear ratios ($r_{gb}$ and $r_p$, respectively), and motor and gearbox efficiencies ($\varepsilon_{mgb}$). Thus, the goal of the model-building exercise was to characterize these loss terms empirically, by generating an empirical model of the relationship between $T_{set}$ and $C_{set}$. This was done, in a first instance by directly measuring applied torque $T_{meas}$, motor current, $C_{set}$ and then applying a generalized linear model (GLM) to the resulting data in MATLAB, resulting a pair of linear coefficients, as shown in the resulting equation (3), below:

$$\hat{C}_S = -0.055 + 0.291 T_{meas} \quad (3)$$

To employ the regression equation for open-loop control, $T_{meas}$ was replaced with $T_{set}$ such that the model predicted current using the adaptive desired assistance profile defined by PJMC (FIG. 7C). The utility of performing low level motor control in this manner is that $T_{set}$ may be calculated (or estimated) on the basis of the user's applied force (as measured with the FSRs discussed above) and knowledge of mechanics of the device, and accordingly, there is no requirement to actually measure $T_{meas}$ as in the closed-loop meathod of FIG. 7C(I) discussed above. As can be seen in FIG. 7C (the middle plot), this simple method of setting motor current as a linear function of $T_{set}$ provides good tracking between $T_{meas}$ (the assistive torque actually supplied) and $T_{set}$.

It was hypothesized that including an estimate of ankle angular velocity would improve the control model discussed above. Accordingly, the microcontroller was also set up to record the motor current (C) and the average motor angular velocity ($\omega_{motor}$) from the motor drivers (ESCON 50/8, Maxon). Ankle angular velocity ($\tilde{\omega}_{ankle}$) was estimated using motor and exoskeleton gear ratios assuming no transmission losses, as follows:

$$\tilde{\omega}_{ankle} = \omega_{motor} r_{gb} r_p \quad (4)$$

As above, motor current and $T_{meas}$ were measured, and $\tilde{\omega}_{ankle}$ was calculated on the basis of motor velocity. A second (GLM) of motor current as a linear function of these two variables was then developed in MATLAB using $T_{meas}$ and $\tilde{\omega}_{ankle}$ as inputs. Positive $\tilde{\omega}_{ankle}$ values correspond to ankle PFX. All coefficients of the fitted model, including the interaction of $T_{meas}$ and $\tilde{\omega}_{ankle}$, were significant at 95% confidence. The complex current model ($\hat{C}_C$) coefficients are summarized below (Eq. 5).

$$\hat{C}_C = -0.124 + 0.282 T_{meas} \quad (5)$$
$$+ 0.578 \tilde{\omega}_{ankle}$$
$$+ 0.002 T_{meas} \tilde{\omega}_{ankle}$$

Substitution of $T_{set}$ into equation (5) yields a method for setting motor current as a function of $T_{set}$ (which, again, is measurable or estimable from force sensing resistors below the foot) and $\tilde{\omega}_{ankle}$.

As an alternative to calculating $\tilde{\omega}_{ankle}$ on the basis of motor velocity, in an alternative embodiment, the complex regression model resulting in equation (5) may use ankle kinematics measured at the joint of the device using an angle sensing technique (e.g., hall sensor, potentiometer, or encoder). This alternative approach (measuring device ankle kinematics) addresses attenuation and delay from the transmission system to improve open-loop control.

Collecting data during functional use cases, according to the methods described herein, ensure that system characteristics (such as energy lost due to friction) and human disturbances (such as walking speed and assistance profile variability) are sufficiently captured and subsequently modeled. According to the idea of the invention, that motor current was assessed with the use of the measured torque ($T_{meas}$) and the estimated ankle angular velocity ($\tilde{\omega}_{ankle}$) based on principles of exoskeleton ankle joint power.

The parameter coefficients of both first and second models can be interpreted to make informed predictions about exoskeleton performance when using these regression-based open-loop current controllers. Since both models are dominated by the torque term, the predicted motor current profile will closely match the desired torque assistance profile.

Additionally, it was expected that the complex (a velocity- and torque-input based) open-loop controller would be more responsive than the simpler (just torque-input based) open-loop controller, because the velocity term in Eq. 5 increases current in response to high ankle angular velocity (FIG. 7B), such as during heel strike and toe-off regions of gait. Furthermore, the interaction term in the complex model of Eq. 5 represents mechanical ankle joint power; the influence of such cross-term likely favorably increases current production when torque and ankle angular velocity have the same direction.

The determination of the linear coefficients of equations (3) and (5), which are exemplary and the result of only one set of many possibly calibration methods, can be accomplished by multiple methods. In one case, the calibration data are collected during various conditions, e.g., on a treadmill at various speeds and/or in various different real world conditions (up and down inclines, up and down squares, on a smooth or rough surfaces, etc.), and then the resulting raw data points are subjected to the linear regression described above. These data can be collected from multiple different users, and the resulting data can be subjected to linear regression together. Alternatively, data from a single a user, for example, a user of similar build, sex, age or level of fitness to the eventual user of the device, can be used. In certain embodiments, different sets of linear coefficients are generated for different phases of the gait cycle (e.g., early stance, swing and late stance, or constituent stance components within these stages). In certain embodiments, coefficients are generated by gathering data on people with motor impairment similar to the individual who is to use the device. In other embodiments, coefficients are generated with data from able bodied people. In certain embodiments, coefficients are generated for people having a range of body types and ability levels, and the resulting data are subject to linear regression analysis in total. In other embodiments, coefficients are generated for different devices having different mechanical properties. For example, a set of coefficients can be generated for devices of different lengths to accommodate users of different heights, where such devices have cables of different lengths. For example, a set of coefficients may be generated for a device designed to accommodate users within three different height ranges, which devices have three different lengths and use transmission cables of three different lengths.

The performance of the open-loop control models was verified using experimental data as set forth below.

Experimental Verification

Five unimpaired individuals participated in a study to validate the control methodologies described above, and to correlate measurable performance parameters with subjective preference (Table 1). Exclusion criteria included any health condition that could affect walking ability or participant safety.

Table 1 below shows participant characteristics. Experience refers to familiarity walking in the exoskeleton prior to data collection. Preference of controller (closed-loop, simple open-loop, or complex open-loop) was surveyed after data collection.

TABLE 1

| User | Age [Years] | Sex | Mass [kg] | Experience | Controller Preference |
| --- | --- | --- | --- | --- | --- |
| P1 | 30 | F | 59.4 | Advanced | Simple open |
| P2 | 27 | M | 69.5 | Beginner | Closed |
| P3 | 25 | M | 86.6 | Advanced | Complex open |
| P4 | 21 | F | 77.2 | Beginner | Closed |
| P5 | 31 | M | 65.8 | Advanced | Complex open |

Experimental Data Collection

All walking trials took place on a treadmill. An operator controlled the treadmill and exoskeleton through a MATLAB graphical user interface. Participants wore the exoskeleton and walked on a treadmill at 1.0 m/s for PJMC baseline calibration; the same participant-specific FSR sensor calibration was used for all trials. All participants were prescribed 0.25 Nm/kg peak PFX torque assistance.

Participants walked with closed-loop torque control, simple (torque-input) open-loop current control, and complex (velocity- & torque-input) open-loop current control in randomized order. Treadmill speed was set to 1.0 m/s, then 1.3 m/s, and back to 1.0 m/s; these speeds are typical for unimpaired adults. The acceleration/deceleration between speeds was set to 0.02 m/s. The time spent at each steady-state speed interval was 3 minutes.

Data Analysis

For all participants, the desired torque set point ($T_{set}$), measured torque ($T_{meas}$), motor current (C), and estimated ankle angular velocity ($\tilde{\omega}_{ankle}$) was recorded. Exoskeleton state transitions separated signals into PFX and DFX regions corresponding to stance and swing phases of gait, respectively. Controller performance analysis and assessment, performed across the entire stance phase, was completed using MATLAB.

Primary controller performance outcome measures included deviance from the desired control signal, overall torque and power generation capacity, battery power consumption, and noise. We calculated root-mean-squared error (RMSE) between $T_{set}$ and $T_{meas}$ to quantify assistance profile tracking performance. Average stance phase measured torque $T_{meas}$ was calculated and normalized by corresponding average demand torque $T_{set}$ to assess peak torque capacity and overall assistance potential.

Battery power consumption was calculated by numerically integrating motor current C with respect to time and is reported in typical units of battery capacity in Ah. We normalized power consumption by $T_{meas}$ to evaluate power use relative to torque produced. Noise levels were calculated by averaging measured sound recordings over the course of each trial.

The demand assistance profile $T_{set}$ is generated in real-time to instantaneously adapt the torque profile to variations in speed and terrain. Additionally, angular velocity is an important contributor to ankle power and a controller must be able to provide torque assistance and also permit joint motion. To assess controller kinematic adaptability, estimated early- and late-stance peak PFX rates for each stance phase were also collected and averaged.

Mechanical joint power supplied to the ankle joint by the exoskeleton was calculated by multiplying $T_{meas}$ and $\omega_{ankle}$ during the stance phase. Average exoskeleton PFX mechanical power output is the mean of PFX-directed joint power over each stance phase. Net PFX joint power was calculated by summing joint power over each stance phase and averaging across the trial. Average power was normalized by mass and net PFX power output was normalized by mass and battery power consumption.

Statistics

All experimental data was tested for outliers in MATLAB. Outliers 1.5 times the interquartile range past the first or third quartiles for the data set were removed from further analysis. When an outlier was removed, corresponding observations were also removed from each control mode to maintain a balanced study design. One-way repeated measures analyses of variance (ANOVAs) were used to detect differences in performance metrics between the closed-loop torque control, simple open-loop current control, and complex open-loop current control schemes. Samples from each walking speed were pooled together for statistical analysis to collectively quantify performance across all experimental conditions. Significantly different means detected by ANOVAs were further analyzed with post-hoc Tukey tests with corrections for multiple comparisons. All statistical analyses were performed at 95% confidence.

Results

Figure 8:
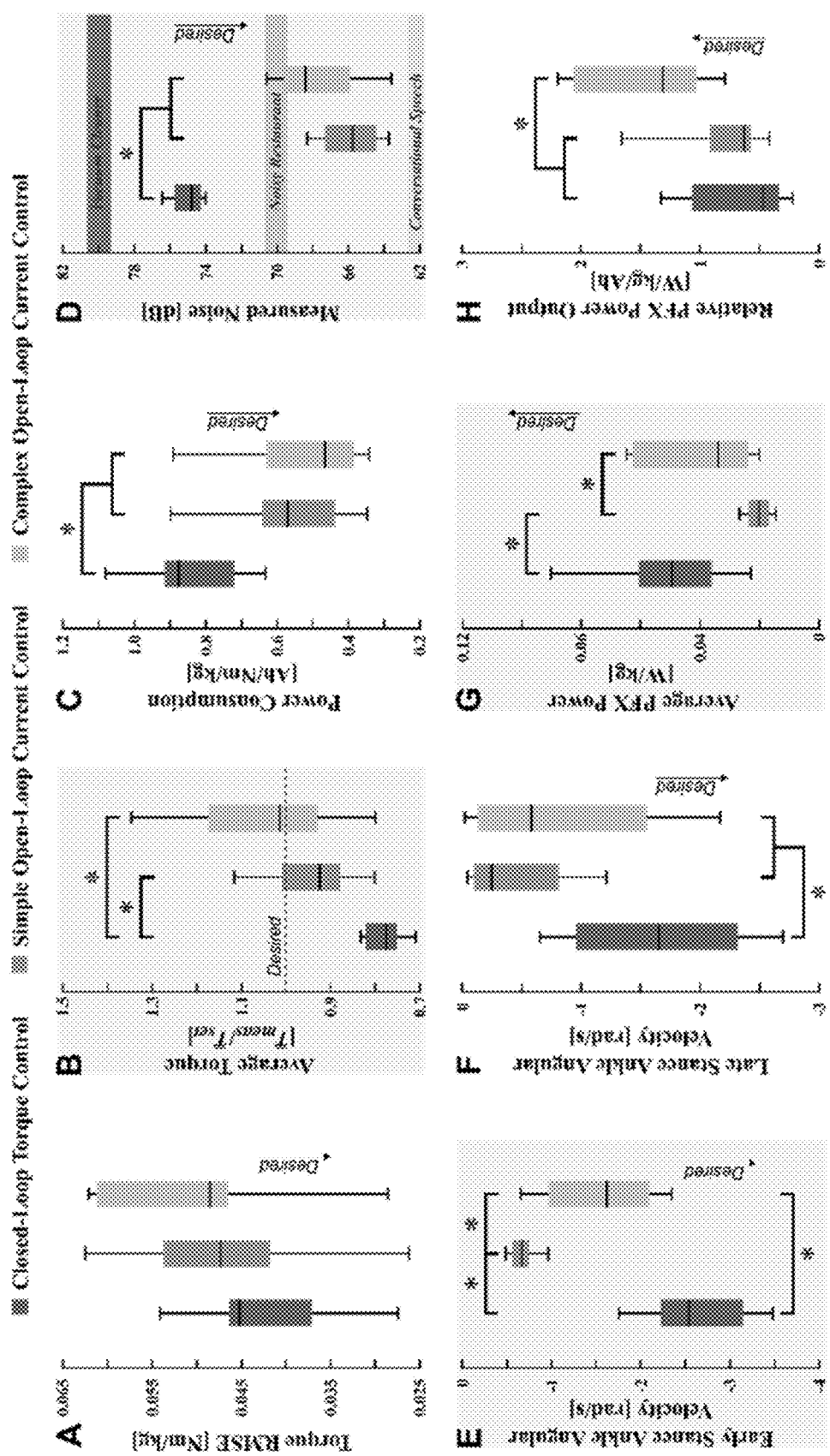
FIG. 8 depicts a summary of controller performance metrics and statistical analyses.

Experimental performance measures for all three control methodologies are presented in FIG. 8. There, minimum, first quartile, median, third quartile, and maximum values are shown. * indicates a significant difference between control modes at 95% confidence. Desired trends are indicated with arrows. (A) shows total stance phase exoskeleton torque root-mean-square error (RMSE). Torque RMSE quantifies the controller effectiveness in tracking the desired torque $T_{set}$. (B) shows measured torque averaged across each stance phase, $T_{meas}$, normalized by the average desired torque of the same step, $T_{set}$. The ratio of measured to desired torque quantifies controller overshoot and general system torque capacity. (C) shows power consumption normalized by average torque $T_{meas}$. (D) shows measured exoskeleton noise during operation. Some typical noise scenarios present a sense of volume scale. (E) shows early stance estimated ankle angular velocity. (Note that an appropriate controller should permit sufficient ankle mobility during walking.) (F) shows late stance (toe-off) estimated angular velocity. (G) shows average exoskeleton plantarflexion (PFX) power output normalized by mass. (H) shows averaged net PFX power produced by the exoskeleton normalized by mass and battery power consumption.

As can be seen from the data summarized in FIG. 8, all three controllers had statistically similar torque RMSE during stance phase assistance (p=0.23, FIG. 2A). Both open-loop controllers had significantly higher average torque production compared to the closed-loop controller (p=0.022 for the simple model, p<0.001 for the complex model, FIG. 8B); torque production was similar between the two open-loop controllers (p=0.46). The simple (just torque-input) and complex (velocity- & torque-input) open-loop controllers had lower power consumption (p<0.001 for both, FIG. 8C) and noise generation (p<0.001 for the simple controller, p=0.002 for the complex controller, FIG. 8D) compared to the closed-loop controller.

Early stance ankle angular velocity was significantly different between all three controllers. The closed-loop controller had the highest peak PFX rate compared to the simple and complex open-loop models (p<0.001 for both, FIG. 8E). The complex model had higher peak PFX rate compared to the simple model (p=0.002, FIG. 8E). The two open-loop models had similar late stance PFX rates (p=0.49) and both rates were significantly less than the closed-loop PFX rate (p=0.002 for the simple model, p=0.035 for the complex model, FIG. 8F).

The complex open-loop controller had significantly higher average positive (PFX-directed) mechanical joint power production than the simple open-loop controller (p=0.020) and similar PFX power production to the closed-loop controller (p=0.36, FIG. 8G). The simple open-loop controller had significantly lower positive power production compared to the closed-loop controller (p<0.001, FIG. 8G). The complex open-loop controller had the highest net PFX power output per unit of battery power consumption (p=0.006 relative to closed-loop, p=0.022 relative to simple open-loop, FIG. 8H).

Discussion of Results

The experimental data validate the hypothesis that an appropriately modeled open-loop current controller can meet or exceed the performance of closed-loop torque-feedback control for providing adaptive ankle exoskeleton assistance during walking. Specifically, both open-loop controllers had similar torque profile tracking. Both open-loop controllers also had greater average torque production, better (lower) battery power consumption relative to torque output, and quieter function than the closed-loop controller. Although early and late stance PFX angular velocity was lower than for the closed-loop controller, both open-loop controllers adapted well to change in walking speed and variable specified torque patterns, consistently producing good profile tracking.

Additionally, the data validate the hypothesis that the inclusion of ankle angular velocity, which was estimated from motor velocity, as a model input would result in improved open-loop controller performance. While average torque and torque tracking RMSE for both open-loop controllers were similar, the complex model resulted in favorably greater early stance PFX rate compared to the simple model, producing outcomes more-similar to during closed-loop control. The complex (velocity- & torque-input) model controller also had greater average PFX power and net PFX power generation relative to battery consumption compared to both the closed-loop and simple controllers.

Participants were asked to identify their preferred controller to assess whether subjective perception matched the quantitative performance results. Controller preference was varied: two participants preferred the closed-loop torque controller, two preferred the complex model open-loop controller, and one preferred the simple model open-loop controller (Table 1). The two participants that preferred the closed-loop torque control stated that they liked the responsiveness of the closed-loop control whereas the open-loop controllers felt "stiffer" and "less responsive." On the other hand, the individuals that preferred open-loop control commented that open-loop control felt more "consistent" particularly in regards to peak torque, and also more "supportive."

Figure 9:
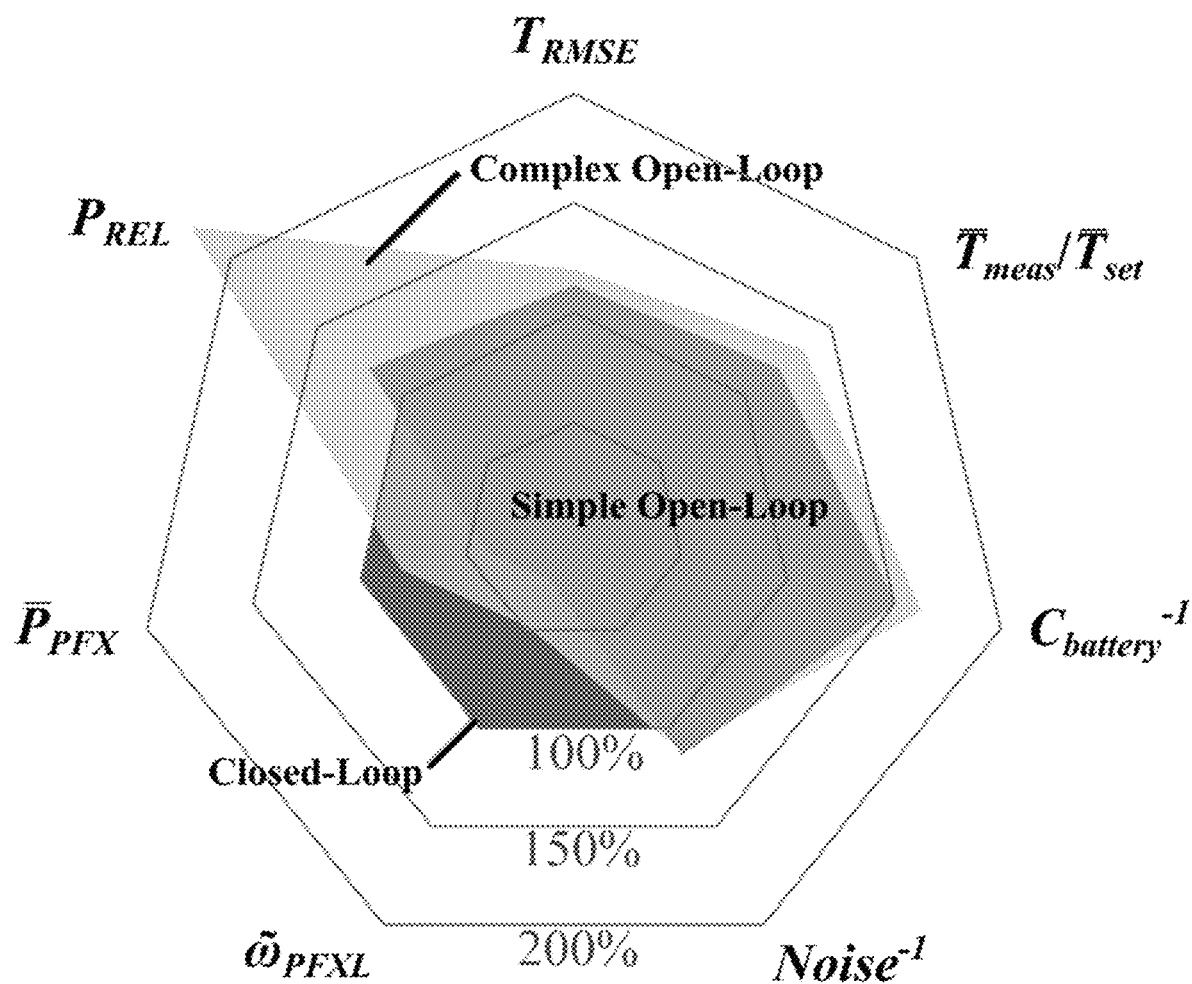
FIG. 9 depicts a radar plot depicting primary controller performance metrics.

Some of these performance tradeoffs are more clearly illustrated in FIG. 9, which depicts a radar plot of the primary controller performance metrics. Results from the simple and complex open-loop controllers are reported as a percentage of the results from closed-loop control. The open-loop controllers had reduced noise and power consumption $C_{battery}$, increased average torque production $T_{meas}/T_{set}$, similar torque tracking $T_{RMSE}$ and average mechanical power $\bar{P}_{PFX}$ delivered to the user, and better ratio of mechanical ankle plantarflexion (PFX) power output to battery power consumption $P_{REL}$ compared to closed-loop control. Both open-loop controllers had reduced ankle angular velocities $\omega_{PFX}$ in late stance compared to closed-loop.

Some of the greatest benefits of open-loop vs. closed-loop control, especially with commercialization in mind, include significantly reduced power consumption and noise generation coupled with greater torque output capability. The open-loop control averaged 127% of the closed-loop average torque output with only 63.5% of the power consumption and 89% of the audible decibel readings (FIG. 9). The 11% reduction in decibel measurement, or around 8 dB, means that the open-loop controllers were nearly half as loud as the closed-loop controller due to the logarithmic scale; noise level went from close to that of a vacuum cleaner for closed-loop control to close to that of conversational speech for open-loop control.

Figure 10A:
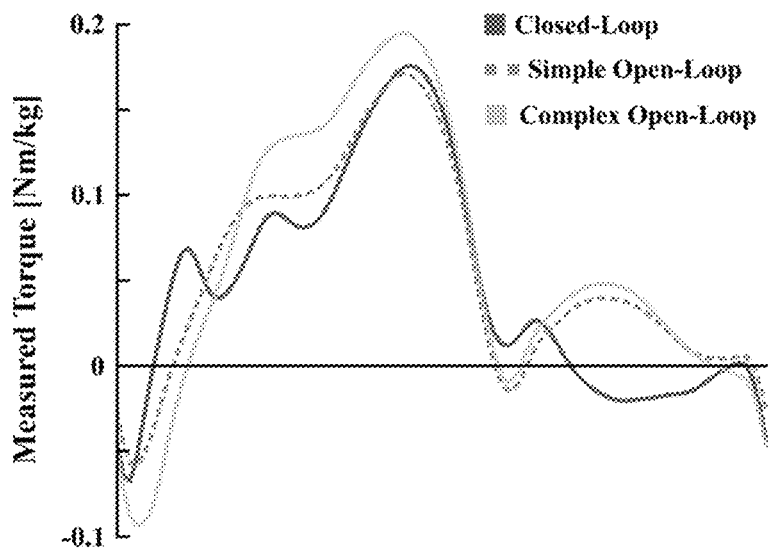
FIGS. 10A-C depict an average ankle torque (A), estimated velocity (B), and joint power (C) for an assistive exoskeleton operating under various control methodologies.
Figure 10B:
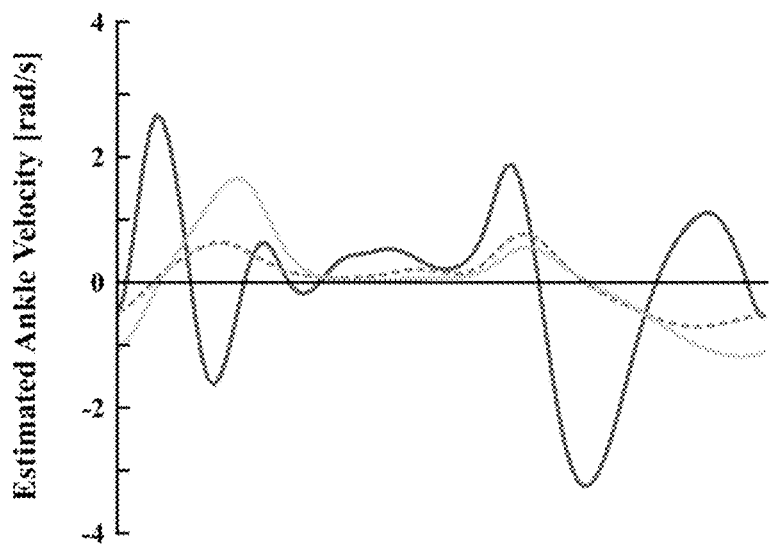
Figure 10C:
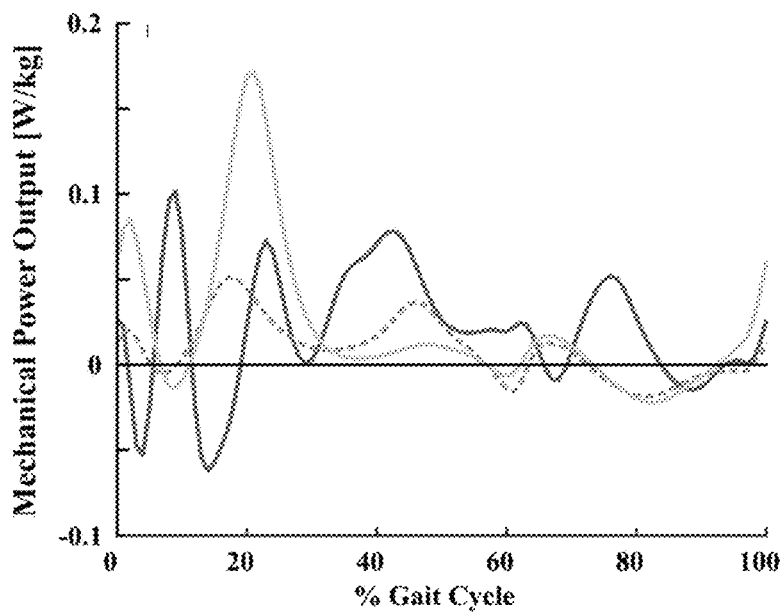

FIGS. 10A-C depict an average ankle torque (A), estimated velocity (B), and joint power (C) for the three control methodologies set forth above with respect to FIG. 7B. Profiles were averaged across participants at the 1.3 m/s treadmill speed. Torque and power profiles were normalized by body mass. Plantarflexion-directed torque, velocity, and power are positive. Both open-loop models had limited late stance power generation due to low ankle angular velocity.

Peak ankle joint mechanical power typically occurs during the late stance phase of walking when the ankle produces large plantar-flexor angular velocity and moment during push-off. Both open-loop controllers potentially suffered from reduced mechanical power delivered to the user during push-off because of low angular velocity despite large assistive torque (FIGS. 10A, B). The closed-loop controller, on the other hand, provided significant mechanical power during late stance phase, mainly through large angular velocity (FIG. 10B).

A limitation of this work was that ankle angular velocity was estimated from motor velocity, so the comparison of mechanical ankle joint power should be interpreted with caution. This is because the exoskeleton is not completely rigid, so the motor velocity likely does not perfectly reflect the kinematics of the biological ankle joint. Mechanical deformation of the carbon fiber foot plate may also be passively storing energy during stance and releasing it during toe-off for propulsion.

It should also be noted that the dorsi-flexion-directed torque and velocity profiles for the closed-loop vs. open-loop controllers appear to be quite different (FIGS. 10A, B) and may contribute to the perception and efficacy of swing phase assistance. DFX assistance level and duration affect ankle mobility and dorsi-flexor muscle activity. Future work will include development of piecewise-continuous regression models to prescribe appropriate assistance at all phases of gait, similar to state-dependent control.

One surprising, yet likely impactful result of the analysis presented herein was that it was found that open-loop current control can increase exoskeleton torque output by almost 40% compared to closed-loop torque-feedback control. This would allow for utilizing a smaller motor assembly to achieve the same assistance level, which would in turn reduce exoskeleton weight and increase the potential metabolic benefit. Future work will look to refine torque tracking because the open-loop controllers occasionally exceeded demand by over 30% (FIG. 8B).

In summary, the results presented herein show that regression-based open-loop motor controllers are a viable approach to "sensor-less," yet responsive ankle exoskeleton control. The velocity- & torque-input open-loop controller matched or exceeded the performance of our standard closed-loop torque-feedback controller with the exception of early and late stance PFX rate. Most notably, this controller had 33% higher average torque, 39% less power consumption, and nearly half the audible noise of the closed-loop controller. The closed-loop controller underperformed with regards to torque output whereas the velocity- & torque-input open-loop controller overperformed with the same RMSE. The velocity- & torque-input open-loop controller was more responsive and powerful than the open-loop controller with only torque-input, with twice the peak early stance PFX rate and 1.8 times the PFX power output ratio relative to power consumption. Real-time velocity input is a necessary component of a responsive open-loop exoskeleton controller. Empirically modelling functional exoskeleton performance via generalized linear regression is a simple and practical method for building responsive open-loop controllers tailored to a particular task. Low-level open-loop exoskeleton controllers hold potential to improve exoskeleton performance, reduce cost and weight by eliminating the need for torque-feedback sensors. The resulting improvements in efficiency and noise generation may facilitate longitudinal intervention studies and out-of-lab use.

The described features, advantages, and characteristics may be combined in any suitable manner in one or more embodiments. One skilled in the relevant art will recognize that the circuit may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrase "in one embodiment," "in an embodiment," and similar language

The invention claimed is:

1. A method of applying assistive force to a joint of a user wearing an orthosis, comprising:
   receiving a force measurement from a pressure sensor, wherein the pressure sensor is configured to measure a force applied by a body part of the user, to produce a force measurement value;
   determining, from the force measurement value, a measured torque applied by the body part of the user;
   determining, based on the measured torque, a desired assistive torque value;
   determining an estimated joint angular velocity;
   determining an actuator drive parameter based on the desired assistive torque value and the estimated joint angular velocity; and
   supplying the determined actuator drive parameter to an actuator to cause the actuator to apply a force to the orthosis to generate a torque force across the joint wherein determining the actuator drive parameter based on the desired assistive torque value comprises determining a level of current supplied to the actuator connected to provide the force to the orthosis to generate the assistive torque across the joint,
   wherein determining the level of current supplied to the actuator comprises applying predetermined linear coefficients to the desired assistive torque value and the estimated joint angular velocity, and
   wherein applying the predetermined linear coefficients to the desired assistive torque value and the estimated joint angular velocity comprises applying a predetermined first scale factor to the desired assistive torque, applying a second predetermined scale factor to the estimated joint angular velocity, applying a third predetermined scale factor to the product of the desired assistive torque and the estimated joint angular velocity, and applying a predetermined offset.

2. The method of claim 1, wherein the torque force generated across the joint approximates the desired assistive torque value.

3. The method of claim 1, wherein the predetermined linear coefficients are determined by linear regression analysis of data comprising measured actuator current, measured torque applied to a joint by a wearer of the orthosis, and determined joint angular velocity, taken under a variety of walking conditions.

4. The method of claim 3, wherein the data comprising measured actuator current, measured torque applied to the joint by the wearer of the orthosis, and determined joint angular velocity, taken under a variety of walking conditions is collected for a specific gait stage.

5. The method of claim 3, wherein the data comprising measured actuator current, measured torque applied to the joint by the wearer of the orthosis, and determined joint angular velocity, taken under a variety of walking conditions is collected for multiple orthoses having different lengths, and different linear coefficients are generated for different length orthoses.

6. The method of claim 1, wherein determining the estimated joint angular velocity comprises measuring an angular velocity of two parts of the orthosis or estimating the joint angular velocity based on the velocity of a drive motor.

* * * * *